United States Patent
Atti et al.

(10) Patent No.: US 10,614,816 B2
(45) Date of Patent: Apr. 7, 2020

(54) SYSTEMS AND METHODS OF COMMUNICATING REDUNDANT FRAME INFORMATION

(71) Applicant: QUALCOMM Incorporated, San Diego, CA (US)

(72) Inventors: Venkatraman S. Atti, San Diego, CA (US); Vivek Rajendran, San Diego, CA (US); Venkatesh Krishnan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 279 days.

(21) Appl. No.: 14/509,817

(22) Filed: Oct. 8, 2014

(65) Prior Publication Data
US 2015/0106106 A1   Apr. 16, 2015

Related U.S. Application Data

(60) Provisional application No. 61/890,092, filed on Oct. 11, 2013.

(51) Int. Cl.
*G10L 19/00* (2013.01)
*G10L 19/002* (2013.01)
(Continued)

(52) U.S. Cl.
CPC ............ *G10L 19/002* (2013.01); *G10L 19/02* (2013.01); *H04L 1/0014* (2013.01);
(Continued)

(58) Field of Classification Search
CPC ..... G10L 19/008; G10L 19/24; G10L 19/167; G10L 21/038; G10L 19/0212;
(Continued)

(56) References Cited

U.S. PATENT DOCUMENTS 6,141,638 A   10/2000  Peng et al.
6,449,313 B1   9/2002  Erzin et al.
(Continued)

FOREIGN PATENT DOCUMENTS

EP    1049073 B1    12/2004
JP    2003533916 A    11/2003
(Continued)

OTHER PUBLICATIONS

Blamey, et al., "Formant-Based Processing for Hearing Aids," Human Communication Research Centre, University of Melbourne, pp. 273-pp. 278, Jan. 1993.
(Continued)

*Primary Examiner* — Vu B Hang
(74) *Attorney, Agent, or Firm* — Moore IP/QUALCOMM Incorporated

(57) ABSTRACT

A method includes receiving a second audio frame at a decoder. The second audio frame follows a first audio frame in an audio signal and includes a first number of bits allocated to primary coding information associated with the second audio frame, a second number of bits allocated to redundant coding information associated with the first audio frame, and an indicator of a frame type of the first audio frame. In response to a frame erasure condition associated with the first audio frame, the second number of bits is determined based on the indicator and used to decode the first audio frame. In clean channel conditions, the first audio frame is received and decoded based on primary coding bits in the first audio frame, and the first number of bits is determined based on the indicator and used to decode the second audio frame.

36 Claims, 10 Drawing Sheets

(51) Int. Cl.
*G10L 19/02* (2013.01)
*H04L 1/00* (2006.01)
*H04L 1/08* (2006.01)

(52) U.S. Cl.
CPC .............. *H04L 1/0075* (2013.01); *H04L 1/08* (2013.01); *G10L 19/0017* (2013.01); *G10L 2019/0001* (2013.01)

(58) Field of Classification Search
CPC ... G10L 19/0204; G10L 19/00; G10L 19/012; G10L 19/018; G10L 19/16; G11B 20/10527
See application file for complete search history.

(56) References Cited

U.S. PATENT DOCUMENTS

| | | |
|---|---|---|
| 6,629,068 B1 | 9/2003 | Horos et al. |
| 6,704,701 B1 | 3/2004 | Gao |
| 6,766,289 B2 | 7/2004 | Kandhadai et al. |
| 6,795,805 B1 | 9/2004 | Bessette et al. |
| 6,801,499 B1 | 10/2004 | Anandakumar et al. |
| 7,117,146 B2 | 10/2006 | Gao |
| 7,272,556 B1 | 9/2007 | Aguilar et al. |
| 7,680,653 B2 | 3/2010 | Yeldener |
| 7,788,091 B2 | 8/2010 | Goudar et al. |
| 7,877,253 B2 | 1/2011 | Krishnan et al. |
| 8,428,938 B2 | 4/2013 | Fang et al. |
| 2002/0147583 A1 | 10/2002 | Gao |
| 2003/0115042 A1 | 6/2003 | Chen et al. |
| 2003/0128851 A1 | 7/2003 | Furuta |
| 2004/0093205 A1 | 5/2004 | Ashley et al. |
| 2006/0147127 A1 | 7/2006 | Edler et al. |
| 2006/0173691 A1 | 8/2006 | Mukaide |
| 2006/0178872 A1* | 8/2006 | Sung ............... G10L 19/005 704/205 |
| 2008/0114605 A1 | 5/2008 | Wu et al. |
| 2008/0208575 A1 | 8/2008 | Laaksonen et al. |
| 2009/0254783 A1 | 10/2009 | Hirschfeld et al. |
| 2010/0054279 A1 | 3/2010 | Feldbauer et al. |
| 2010/0241433 A1 | 9/2010 | Herre et al. |
| 2010/0312552 A1 | 12/2010 | Zheng et al. |
| 2010/0312553 A1* | 12/2010 | Fang ............... G10L 19/005 704/226 |
| 2010/0332223 A1 | 12/2010 | Morii et al. |
| 2011/0099004 A1 | 4/2011 | Krishnan et al. |
| 2011/0295598 A1 | 12/2011 | Yang et al. |
| 2012/0101824 A1 | 4/2012 | Chen |
| 2012/0221326 A1 | 8/2012 | Grancharov et al. |
| 2012/0265523 A1* | 10/2012 | Greer ............... G10L 19/24 704/201 |
| 2012/0300946 A1 | 11/2012 | Ma |
| 2012/0323571 A1 | 12/2012 | Song et al. |
| 2013/0185062 A1 | 7/2013 | Krishnan et al. |
| 2013/0191121 A1 | 7/2013 | Rajendran et al. |

FOREIGN PATENT DOCUMENTS

| | | |
|---|---|---|
| RU | 2495502 C2 | 10/2013 |
| WO | 0223536 A2 | 3/2002 |
| WO | 08043095 | 4/2008 |
| WO | 2010141755 A1 | 12/2010 |
| WO | 2012158157 A1 | 11/2012 |

OTHER PUBLICATIONS

Boillot, et al., "A Loudness Enhancement Technique for Speech," IEEE, 0-7803-8251-X/04, ISCAS 2004, pp. V-616-pp. V-619, 2004.
Cheveigne, "Formant Bandwidth Affects the Identification of Competing Vowels," CNRS-IRCAM, France, and ATR-HIP, Japan, p. 1-p. 4, 1999.
Coelho, et al., "Voice Pleasantness: On the Improvement of TTS Voice Quality," Instituto Politécnico do Porto, ESEIG, Porto, Portugal, MLDC—Microsoft Language Development Center, Lisbon, Portugal, Universidade de Vigo, Dep. Teoria de la Señal e Telecomuniçõns, Vigo, Spain, p. 1-p. 6, download.microsoft.com/download/a/0/b/a0b1a66a-5ebf-4cf3-9453-4b13bb027f1f/jth08voicequality.pdf.
Cole, et al., "Speech Enhancement by Formant Sharpening in the Cepstral Domain," Proceedings of the 9th Australian International Conference on Speech Science & Technology, Australian Speech Science & Technology Association Inc., pp. 244-pp. 249, Melbourne, Australia, Dec. 2-5, 2002.
Cox, "Current Methods of Speech Coding," Signal Compression: Coding of Speech, Audio, Text, Image and Video, ed. N. Jayant, ISBN-13: 9789810237653, vol. 7, No. 1, pp. 31-pp. 39, 1997.
ISO/IEC 14496-3:2005(E), Subpart 3: Speech Coding—CELP, pp. 1-165, 2005.
ITU-T, "Series G: Transmission Systems and Media, Digital Systems and Networks, Digital terminal equipments—Coding of analogue signals by methods other than PCM, Dual rate speech coder for multimedia communications transmitting at 5.3 and 6.3 kbit/s", G.723.1, ITU-T, pp. 1-pp. 64, May 2006.
Jokinen, et al., "Comparison of Post-Filtering Methods for Intelligibility Enhancement of Telephone Speech," 20th European Signal Processing Conference (EUSIPCO 2012), ISSN 2076-1465, p. 2333-p. 2337, Bucharest, Romania, Aug. 27-31, 2012.
Taniguchi T et al, "Pitch Sharpeing for Perceptually Improved CELP, and the Sparse-Delta Codebook for Reduced Computation", Proceedings from the International Conference on Acoustics, Speech & Signal Processing, ICASSP, pp. 241-244, Apr. 14-17, 1991.
Zorila, et al., "Improving Speech Intelligibility in Noise Environments by Spectral Shaping and Dymanic Range Compression," The Listening Talker—An Interdisciplinary Workshop on Natural and Synthetic Modification of Speech, LISTA Workshop in Response to Listening Conditions. Edinburgh, May 2-3, 2012, pp. 1.
Zorila, et al., "Improving Sppech Intelligibility in Noise Environments by Spectral Shaping and Dynamic Range Compression," FORTH—Institute of Computer Science, Listening Talker, pp. 1.
Zorila, et al., "Speech-In-Noise Intelligibility Improvement Based on Power Recovery and Dynamic Range Compression," 20th European Signal Processing Conference (EUSIPCO 2012), ISSN 2076-1465, pp. 2075-pp. 2079, Bucharest, Romania, Aug. 27-31, 2012.
International Search Report and Written Opinion for International Application No. PCT/US2014/059931, ISA/EPO, dated Jan. 26, 2015, 11 pages.

\* cited by examiner

| Frame$_{N-1}$ | |
|---|---|
| Index | Value |
| 0 | 0.1 |
| 1 | 0.4 |
| 2 | 1.0 |
| 3 | 1.6 |
| 4 | 3.6 |
| 5 | 8.0 |
| 6 | 16.0 |
| 7 | 20.0 |

| Frame$_N$ | |
|---|---|
| Index | Value |
| 0 | 0.1 |
| 1 | 0.4 |
| 2 | 1.0 |
| 3 | 1.6 |
| 4 | 3.6 |
| 5 | 8.0 |
| 6 | 16.0 |
| 7 | 20.0 |

| Frame$_{N+1}$ | |
|---|---|
| Index | Value |
| 0 | 0.1 |
| 1 | 0.4 |
| 2 | 1.0 |
| 3 | 1.6 |
| 4 | 3.6 |
| 5 | 8.0 |
| 6 | 16.0 |
| 7 | 20.0 |

| Frame$_{N+2}$ | |
|---|---|
| Index | Value |
| 0 | 0.1 |
| 1 | 0.4 |
| 2 | 1.0 |
| 3 | 1.6 |
| 4 | 3.6 |
| 5 | 8.0 |
| 6 | 16.0 |
| 7 | 20.0 |

*FIG. 4*

SYSTEMS AND METHODS OF COMMUNICATING REDUNDANT FRAME INFORMATION

I. CROSS-REFERENCE TO RELATED APPLICATIONS

The present application claims priority from U.S. Provisional Patent Application No. 61/890,092 entitled "SYSTEMS AND METHODS OF COMMUNICATING REDUNDANT FRAME INFORMATION," filed Oct. 11, 2013, the contents of which are incorporated by reference in their entirety.

II. FIELD

The present disclosure is generally related to communicating redundant frame information.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

Electronic devices, such as wireless telephones, may send and receive data via networks. For example, audio data may be sent and received via a circuit-switched network (e.g., the public switched telephone network (PSTN), a global system for mobile communications (GSM) network, etc.) or a packet-switched network (e.g., a voice over internet protocol (VoIP) network, a voice over long term evolution (VoLTE) network, etc.). In a packet-switched network, audio packets may be individually routed from a source device to a destination device. Due to network conditions, the audio packets may arrive out of order. The destination device may store received packets in a de-jitter buffer and may rearrange the received packets if needed.

Various encoding schemes may be used when communicating audio data. For example, depending on the audio frame type, a code-excited linear prediction (CELP) approach or a frequency-domain based modified discrete cosine transform (MDCT) can be used to compactly represent the speech and audio. In order to improve coding efficiency at low bit rates, (e.g., 13.2 kilobits per second (kbps), 24.4 kbps, etc.) when encoding larger bandwidths, e.g., up to 8 kilohertz (kHz) wideband (WB), 16 kHz super-wideband (SWB), or 20 kHz full-band, the lower band core (e.g., up to 6.4 kHz or up to 8 kHz) is typically encoded using waveform-matching coding techniques such as CELP or MDCT. A bandwidth extension (BWE) is performed that models the high-band (e.g., >6.4 kHz or >8 kHz) and encodes "side information" (e.g., associated with high band parameters). The high-band side information may include linear prediction (LP) filter coefficients and gain parameters that models both fine and coarse temporal evolution. An encoder or a source device may send the side information along with the low-frequency portion to the destination device so that the destination device can synthesize the high-frequency portion of the audio frame at the destination device for high quality reconstruction.

IV. SUMMARY

Because packets in packet-switched networks can arrive out of order, it is possible that even though a particular packet (e.g., corresponding to audio frame N) is corrupted or lost, a subsequent packet (e.g., corresponding to audio frame N+2) may be error-free and available in the de-jitter buffer. Thus, it may be useful to include, in the subsequent frame (e.g., frame N+2), redundant coding information (e.g., error-correction information) that can be used to reconstruct the previous frame (e.g., frame N).

The present disclosure describes systems and methods of communicating redundant frame information. In accordance with the described techniques, when a bandwidth extension (BWE) scheme is in use, an audio frame may include four types of data: an encoded low-band core, high-band side information, redundant coding information associated with a low-band portion of a previous frame, and redundant coding information associated with high-band parameters of the previous frame. The low-band core and high-band side information for a current frame may be collectively referred to as a "primary" coding. The redundant coding information for the low-band and high-band for a previous frame may be collectively referred to as a "partial copy." Thus, a frame may include primary coding bits for its own low-band and high-band, and the frame may also include partial copy bits for low-band and high-band of a previous frame.

When a frame erasure condition occurs (e.g., the previous frame is not received or is corrupted due to a network error), the redundant coding information may be used by a receiver to reconstruct the previous frame. Further, the number of bits allocated to each of the four types of data, i.e., low-band core, high-band side information, partial copy of the previous frame's low-band core, and partial copy of the previous frame's high-band, may be dynamically adjusted based on properties of an audio signal being transmitted. Even when the previous frame is received successfully (e.g., in clean channel conditions), a decoder may separate the primary coding bits from the partial copy bits prior to decoding the primary coding bits.

In a particular aspect, a method of decoding a frame includes receiving a second audio frame at a decoder of a computing device, where the second audio frame follows a first audio frame in an audio signal. The second audio frame includes a first number of bits allocated to primary coding information (e.g., encoded low-band core and high-band parameters) associated with the second audio frame. The second audio frame also includes a second number of bits allocated to redundant (e.g., partial copy) coding information associated with the first audio frame. The second audio frame further includes an indicator of a frame type (e.g., partial copy frame type) of the first audio frame. The method includes, in response to a frame erasure condition associated with the first audio frame, determining, based on the indicator, the second number of bits of the second audio frame that are allocated to the redundant coding information associated with the first audio frame. The method further includes decoding the first audio frame based on the redundant coding information.

In another particular aspect, a method of decoding a frame includes receiving a first audio frame and a second audio frame at a decoder of a computing device. The second audio frame follows the first audio frame in an audio signal. The second audio frame includes a first number of bits allocated to primary coding information associated with the second audio frame, a second number of bits allocated to redundant coding information associated with the first audio frame, and an indicator of a frame type of the first audio frame. The method also includes decoding the first audio frame. The method further includes determining, based on the indicator, the first number of bits of the second audio frame that are allocated to the primary coding information associated with the second audio frame. The method includes decoding the second audio frame based on the primary coding information. In a particular embodiment, the method includes determining the first number of bits allocated to the primary coding information associated with the second audio frame by subtracting the second number of bits allocated to the partial copy of the first audio frame from a total number of bits (e.g., used to represent the second audio frame).

In another particular aspect, a method of encoding a frame includes encoding a first audio frame of an audio signal at an encoder of a first computing device and transmitting the first audio frame from the first computing device to a second computing device. The method also includes determining, based on a frame type of the first audio frame, a first number of bits of a second audio frame to allocate to primary coding information associated with the second audio frame and a second number of bits of the second audio frame to allocate to redundant coding information associated with the first audio frame. The second audio frame follows the first audio frame in the audio signal. The method also includes encoding the second audio frame and transmitting the second audio frame from the first computing device to the second computing device. The second audio frame includes the first number of bits of primary coding information, the second number of bits of redundant coding information, and an indicator of the frame type of the first audio frame.

In another particular aspect, an apparatus includes a receiver configured to receive a second audio frame. The second audio frame follows a first audio frame in an audio signal. The second audio frame includes a first number of bits allocated to primary coding information associated with the second audio frame. The second audio frame also includes a second number of bits allocated to redundant coding information associated with the first audio frame. The second audio frame further includes an indicator of a frame type of the first audio frame. The apparatus also includes a decoder configured to, in response to a frame erasure condition associated with the first audio frame, determine, based on the indicator, the second number of bits of the second audio frame that are allocated to the redundant coding information associated with the first audio frame. The decoder is configured to decode the first audio frame based on the redundant coding information.

In another particular aspect, an apparatus includes a receiver configured to receive a first audio frame and a second audio frame that follows the first audio frame in an audio signal. The second audio frame includes a first number of bits allocated to primary coding information associated with the second audio frame. The second audio frame also includes a second number of bits allocated to redundant coding information associated with the first audio frame. The second audio frame further includes an indicator of a frame type of the first audio frame. The apparatus also includes a decoder configured to decode the first audio frame and to determine, based on the indicator, the first number of bits of the second audio frame that are allocated to the primary coding information associated with the second audio frame. The decoder is configured to decode the second audio frame based on the primary coding information.

In another particular aspect, an apparatus includes an encoder configured to encode a first audio frame of an audio signal. The encoder is also configured to determine, based on a frame type of the first audio frame, a first number of bits of a second audio frame to allocate to primary coding information associated with the second audio frame and a second number of bits of the second audio frame to allocate to redundant coding information associated with the first audio frame. The encoder is further configured to encode the second audio frame. The second audio frame follows the first audio frame in an audio signal. The second audio frame includes the first number of bits of primary coding information, the second number of bits of redundant coding information, and an indicator of the frame type of the first audio frame. The apparatus also includes a transmitter configured to transmit the first audio frame and the second audio frame to a destination device.

Particular advantages provided by at least one of the disclosed embodiments include an ability to provide redundant coding information for an earlier frame of an audio stream in a later frame of the audio stream. The redundant coding information included in the later frame may enable reconstruction of the earlier frame, such as when the earlier frame is corrupted or lost due to a network error. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 4 is a diagram to illustrate a particular embodiment of a high-band gain frame codebook;

Figure 7:
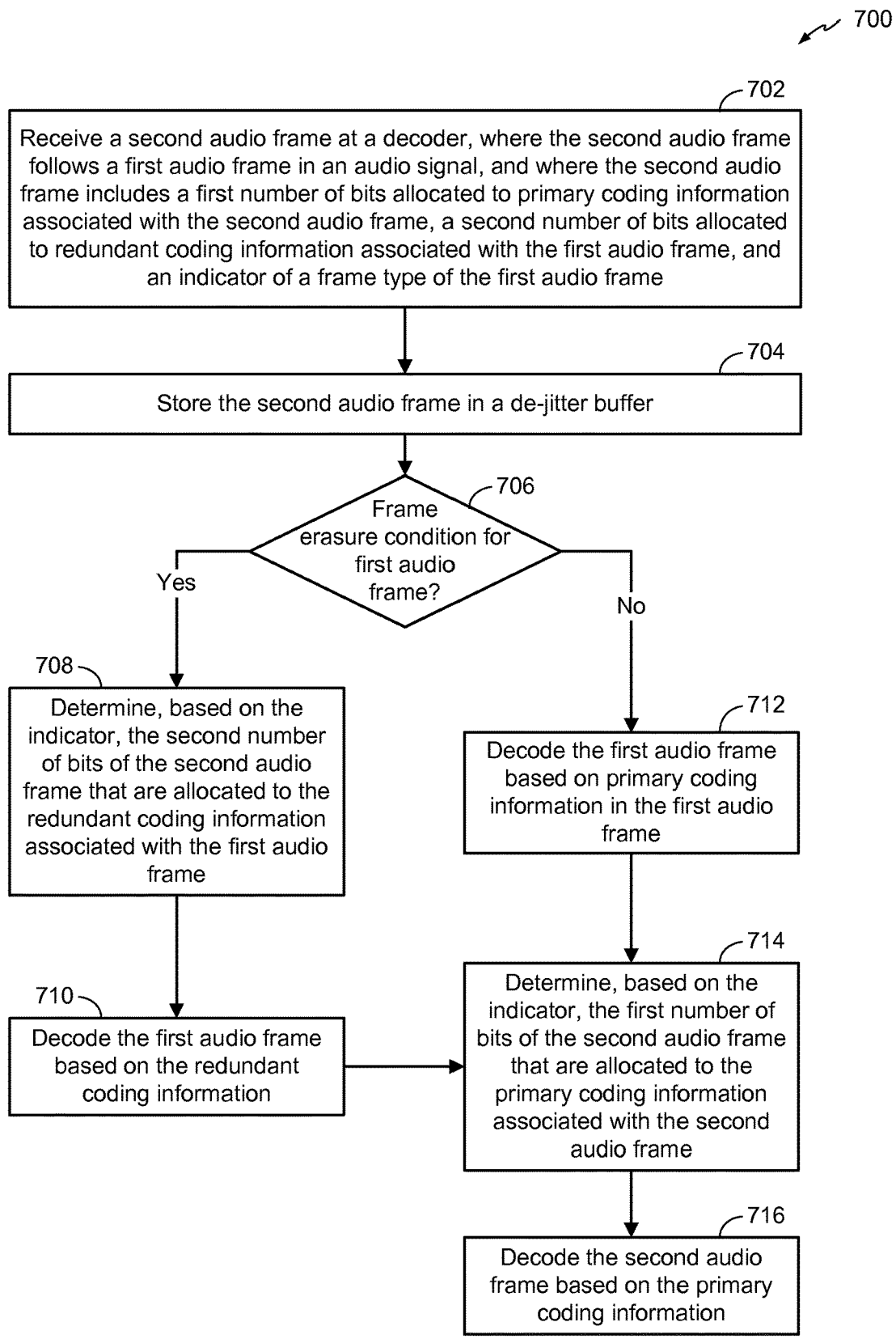
Figure 8:
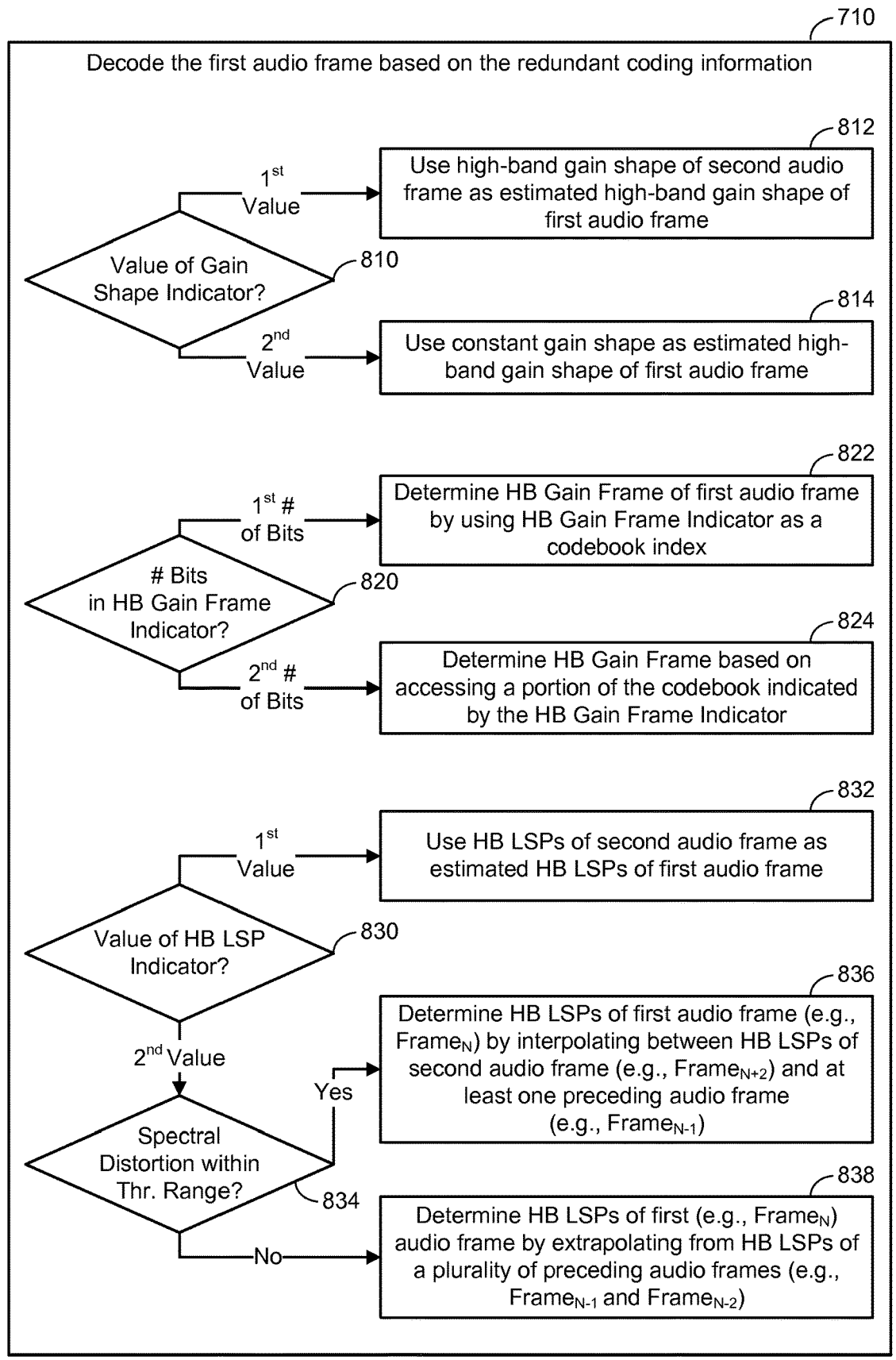
Figure 9:
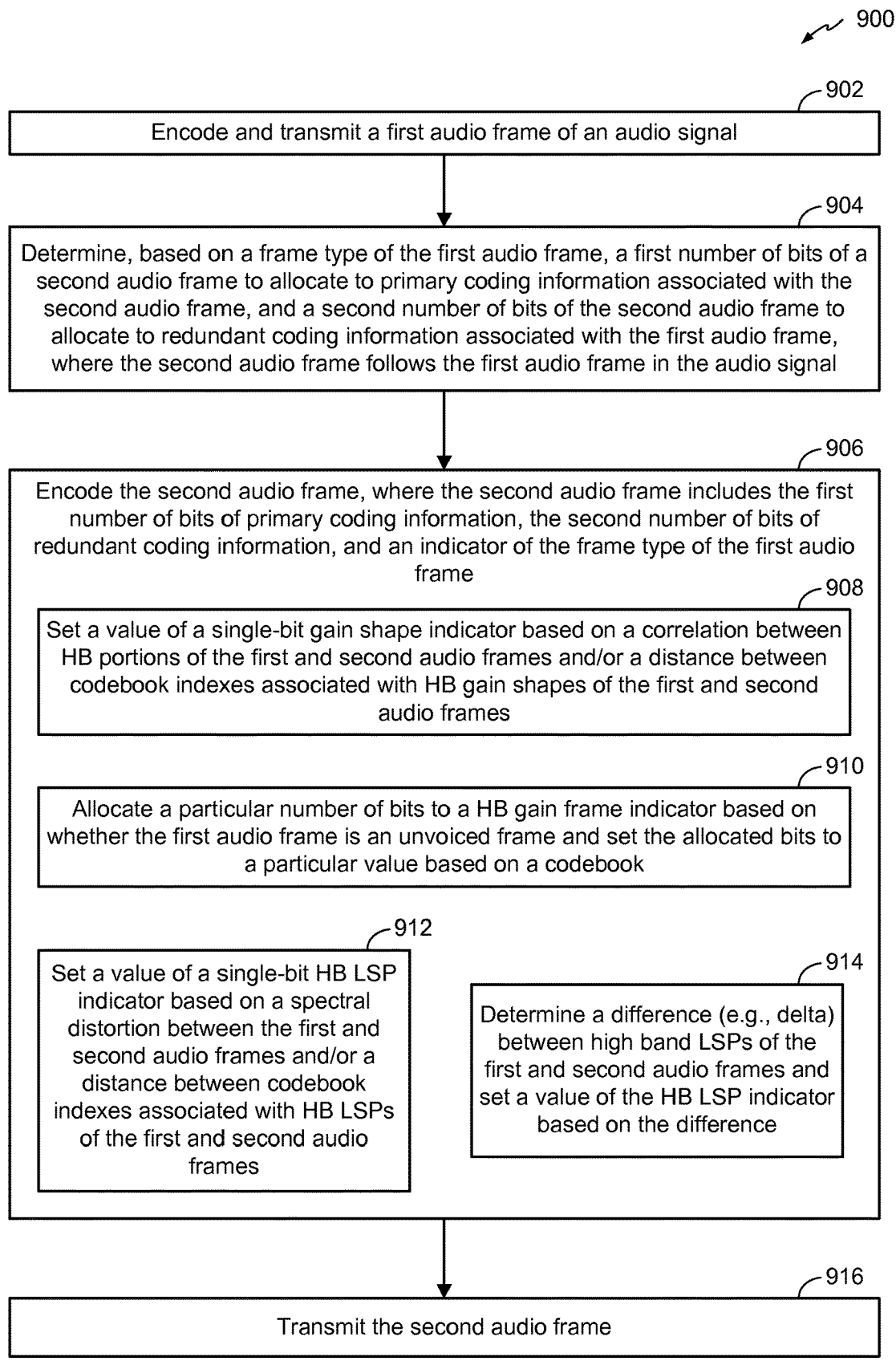
Figure 10:
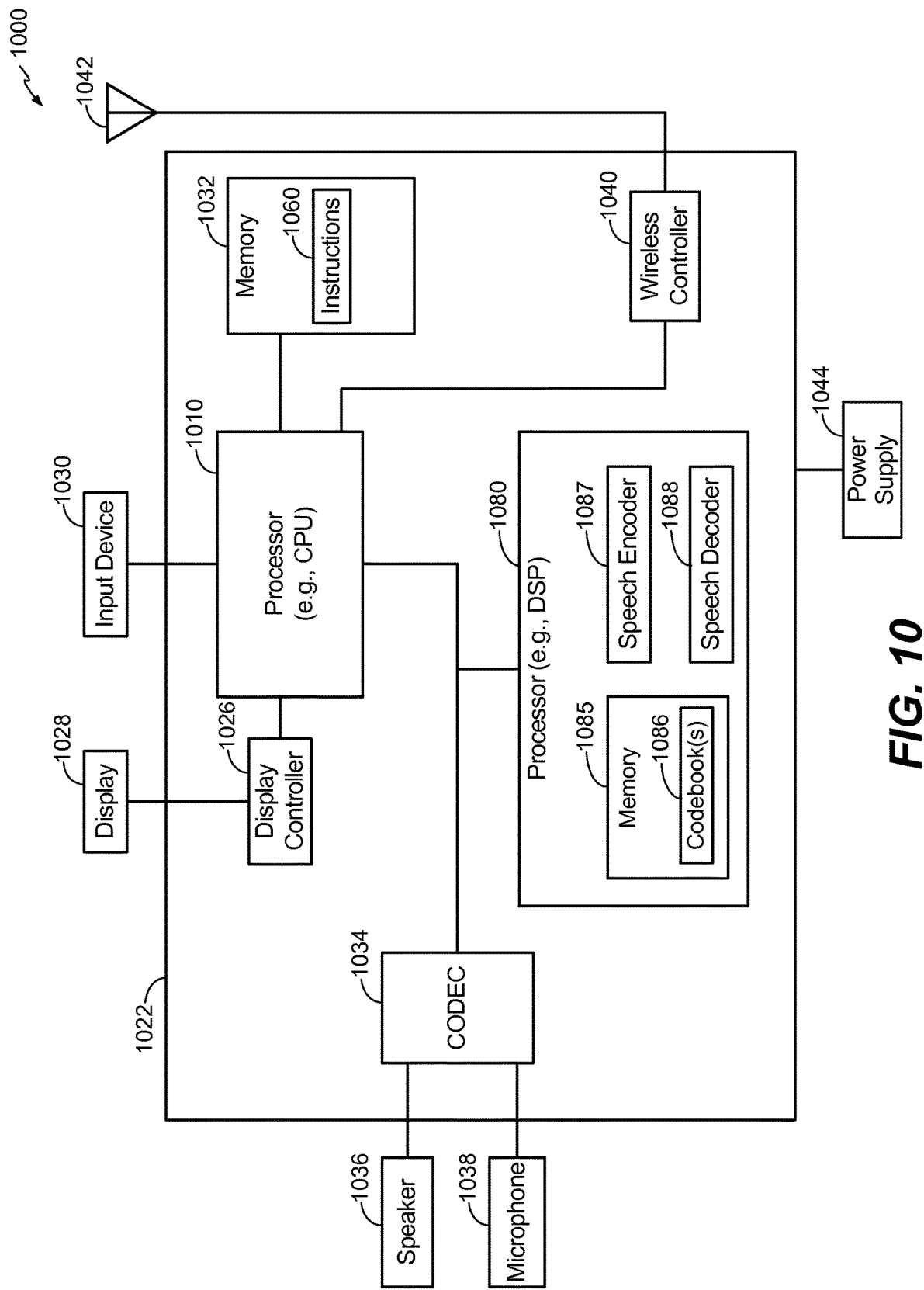

FIG. 7 and FIG. 8 collectively depict a flow chart to illustrate a particular embodiment of a method of decoding a frame based on redundant coding information included in a subsequent frame;

FIG. 9 is a flow chart to illustrate a particular embodiment of encoding redundant coding information for a frame into a subsequent frame; and FIG. 10 is a block diagram of a wireless device operable to perform operations in accordance with the systems and methods of FIGS. 1-9.

VI. DETAILED DESCRIPTION

Particular embodiments of the present disclosure are described below with reference to the drawings. In the description and the drawings, common features are designated by common reference numbers for clarity of the embodiments as depicted and described.

Figure 1:
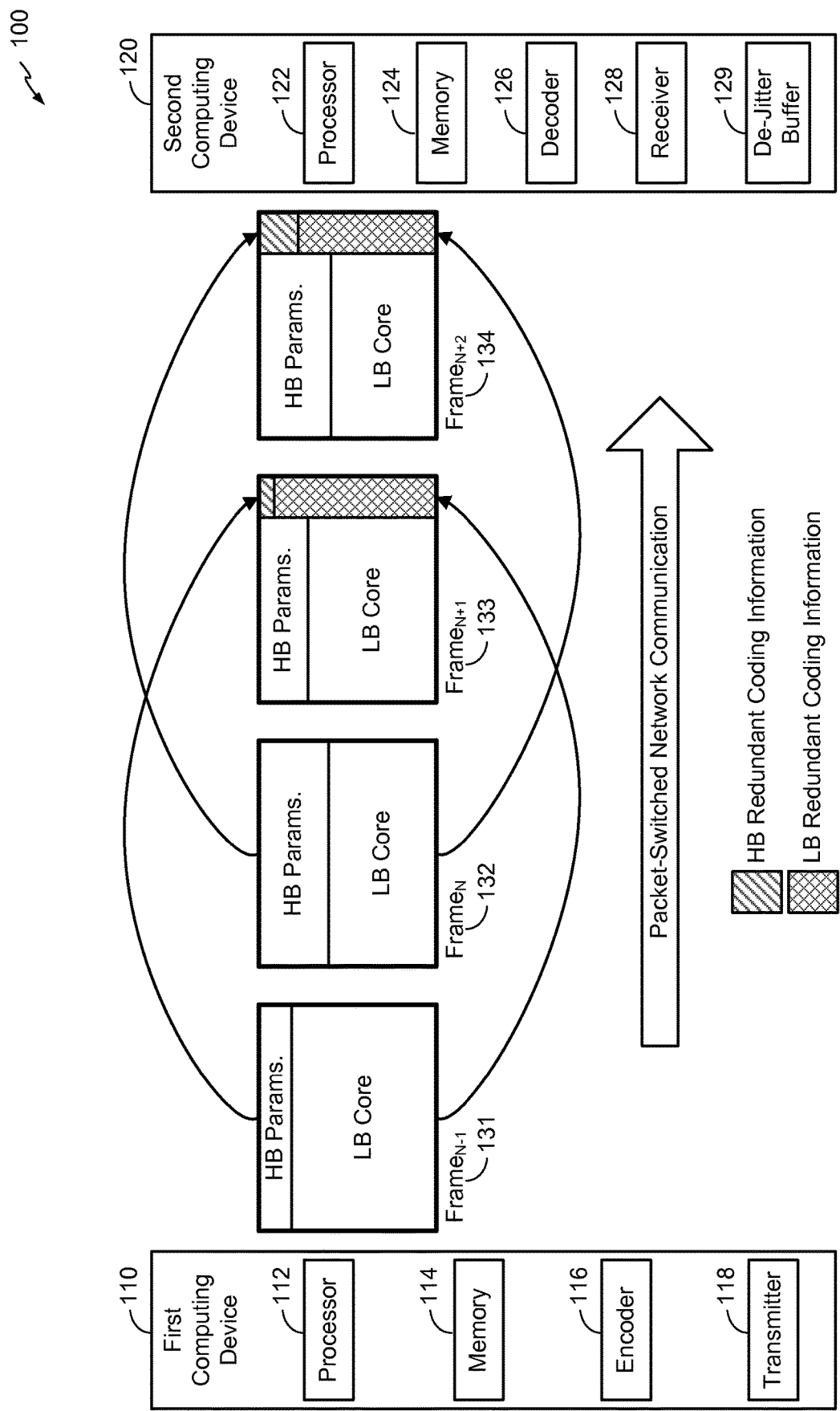
FIG. 1 is a diagram to illustrate a particular embodiment of a system that is operable to communicate redundant frame information.

Referring to FIG. 1, a particular embodiment of a system that is operable to communicate redundant frame information is shown and generally designated 100. The system 100 includes a first computing device 110 and a second computing device 120. The first computing device 110 and the second computing device 120 may be configured to communicate data, such as audio frames, via a packet-switched network. For example, the packet-switched network may include a VoIP network, a VoLTE network, or another packet-switched network. In an illustrative embodiment, the first computing device 110 and the second computing device 120 each include a mobile phone, a computing device (e.g., a laptop computer, a desktop computer, a tablet computer, a server computer, etc.), a media player, a gaming device, a set-top box device, a navigation device, a component of a packet-switched network, another device configured to communicate audio data, or any combination thereof.

The first computing device 110 may include a processor 112 (e.g., a central processing unit (CPU), a digital signal processor (DSP), etc.) and a memory 114. In a particular embodiment, the memory 114 stores instructions executable by the processor 112 to perform various operations described herein. The first computing device 110 may also include an encoder 116 and a transmitter 118. The encoder 116 may encode audio frames that are transmitted by the transmitter 118 (e.g., via a packet-switched network). In alternate embodiments, the first computing device 110 may include a receiver in addition to the transmitter 118, or may include a transceiver configured to transmit and receive data. The encoder 116 may encode a sequence of audio frames, including illustrative audio frames 131, 132, 133, and 134. In FIG. 1, the audio frames 131, 132, 133, and 134 are four successive frames of an audio signal and are designated as an (N−1)th frame, an Nth frame, an (N+1)th frame, and an (N+2)th frame, respectively. For readability, these frames are referred to herein as $frame_{N-1}$, $frame_N$, $frame_{N+1}$, and $frame_{N+2}$, respectively. It should be noted that although the audio frames 131-134 are illustrated in FIG. 1 in left-to-right order, this should not be interpreted as implying that the audio frames 131-134 are received in such order by the second computing device 120. As further described herein, audio frames can arrive at a destination device out of order or can be lost due to a network error.

Each of the audio frames 131-134 may include an encoded low-band signal ("LB Core") and high-band parameters ("HB Params."). The LB core and HB parameters of a frame may collectively be referred to as a primary coding of the frame. In a particular embodiment, each of the audio frames 131-134 has a fixed size, and the amount of bandwidth (e.g., number of bits of a frame) allocated to the encoded low-band core and to the high-band parameters can be dynamically adjusted from frame to frame, as further described herein. To improve audio decoding performance in the presence of network errors, one or more of the audio frames 131-134 may include redundant coding information of a previous frame. The redundant coding information may include low-band redundant coding information and/or high-band parameter redundant coding information. The redundant coding information for the low-band and high-band of a previous frame may collectively be referred to as a "partial copy" of the previous frame. In a particular embodiment, the amount of bandwidth (e.g., number of bits of a frame) allocated to the low-band redundant coding information and to the high-band redundant coding information can be dynamically adjusted from frame to frame, as further described herein.

For example, the encoder 116 may encode redundant coding information for $frame_N$ 132 in a subsequent $frame_{N+OFFSET}$, where OFFSET is an integer greater than or equal to 1. When frames are communicated via a packet-switched network, each frame may be routed individually to a destination device and frames may arrive out of order. Thus, even though $frame_N$ 132 (or a portion thereof) may be corrupted or may not arrive at the second computing device 120 (collectively referred to herein as a "frame erasure" condition with respect to the $frame_N$ 132), $frame_{N+OFFSET}$ may arrive (or may already have arrived) at the second computing device 120 intact. The redundant coding information in $frame_{N+OFFSET}$ may be used by the second computing device 120 to reconstruct $frame_N$ 132 (or a portion thereof) or arrest a severe artifact-introducing error propagation.

In the example of FIG. 1, OFFSET is equal to 2. Thus, redundant coding information for the $frame_{N-1}$ frame 131 is added to $frame_{N+1}$ 133, redundant coding information for $frame_N$ 132 is added to $frame_{N+2}$ 134, etc. In alternate embodiments, the OFFSET parameter may have a value other than 2. The value of the OFFSET parameter may be defined by an industry standard (e.g., an enhanced voice services (EVS) standard), may be negotiated by the computing devices 110 and 120, and/or may be determined based on measured or estimated network errors. In an illustrative embodiment, the first computing device 110 may be configured to determine whether or not to send redundant coding information. For example, the first computing device 110 may determine whether or not to send redundant frame information for $frame_N$ 132 in the $frame_{N+2}$ 134 based on a "criticality" parameter associated with $frame_N$ 132, where the criticality parameter indicates a relative importance of $frame_N$ 132 in reducing or minimizing artifacts in an audio signal should the $frame_N$ 132 be lost during transmission. Thus, communication of redundant frame information may be performed, depending on source-controlled parameters as well as based on network or channel conditions, on a per-frame basis.

In a particular embodiment, the amount of space (e.g., number of bits) occupied in a frame by LB core, HB parameters, HB redundant coding information, and LB redundant coding information is dynamically adjusted by the encoder 116. For example, as shown in FIG. 1, the ratio of HB to LB redundant coding information is lower in $frame_{N+1}$ 133 than in $frame_{N+2}$ 134. In a particular embodiment, the HB to LB redundant coding information varies between a [25%, 75%] split and a [5%, 95%] split. As another example, as shown in FIG. 1, the ratio of HB parameters to LB core is lower in $frame_{N-1}$ 131 than in $frame_{N+1}$ 133, and the ratio of HB parameters to LB core is lower in $frame_{N+1}$ 133 than in $frame_N$ 132 and $frame_{N+2}$ 134.

As an example, the nominal encoding bitrate for an audio frame may be 13.2 kbps when no redundant coding information is included in the audio frame. To accommodate the redundant coding information, the coding rate for the LB core and HB parameters of the audio frame may be reduced to 9.6 kbps. The remaining 3.6 kbps bandwidth may be used to encode the HB and LB redundant coding information for a previous frame, where the split between HB and LB redundant coding information can dynamically vary from frame to frame between a [25%, 75%] split and a [5%, 95%] split. It should be noted that the described bitrates and splits are for example only. In alternate embodiments, the described techniques may be used with different bitrates and different splits. In another particular embodiment, the ratio of bits distributed between the redundant frame and the primary frame may be adaptive. For example, the primary frame may use 11.6 kbps while the redundant frame may use 1.6 kbps of the total 13.2 kbps. In another example, the primary frame may use 12.6 kbps while the redundant frame may use 0.6 kbps of the total 13.2 kbps. Based on a "criticality" parameter, this dynamic bit allocation may be achieved and may limit degradation of the primary frame quality in the presence of no network errors or in clean channel conditions when some bits are used for redundant frame coding.

When determining how much space to allocate to the HB redundant coding information and to the LB redundant coding information in a particular frame (e.g., frame$_{N+2}$ 134), the encoder 116 may take into account properties of the packet-switched network being used, the particular frame, and/or the previous frame for which redundant coding information is being transmitted (e.g., frame$_N$ 132). Examples of redundant coding information and dynamically adjusting how much space is allocated to such redundant coding information within an audio frame are further described with reference to FIGS. 2-9.

The second computing device 120 may include a processor 122 and a memory 124. In a particular embodiment, the memory 124 stores instructions executable by the processor 122 to perform various operations described herein. The second computing device 120 may also include a decoder 126 and a receiver 128. The decoder 126 may decode audio frames that are received by the receiver 128 (e.g., via a packet-switched network), such as the audio frames 131, 132, 133, and/or 134. In alternate embodiments, the second computing device 120 may include a transmitter in addition to the receiver 128, or may include a transceiver configured to transmit and receive data.

In a particular embodiment, the second computing device 120 includes a buffer, which is illustrated in FIG. 1 as a de jitter buffer 129. The receiver 128 may store received packets (e.g., audio frames) in the de-jitter buffer 129. Because packets transmitted over packet-switched networks can arrive out of order, the de-jitter buffer 129 may be used to store and reorder the received packets based on, e.g., a packet timestamp. In the presence of network errors, the decoder 126 may be unable to decode all or part of one or more packets, because the packets (or portion(s) thereof) may be corrupted or lost (e.g., not received). For example, during transmission of the audio frames 131-134, frame$_N$ 132 may be lost. The decoder 126 may reconstruct the lost frame$_N$ 132 from the redundant coding information in frame$_{N+2}$ 134. Examples of redundant coding information and reconstruction of a lost audio frame are further described with reference to FIGS. 2-9.

During operation, the first computing device 110 may encode and transmit the audio frames 131-134 to the second computing device 120 via a packet-switched network. The second computing device 120 may buffer received audio frames in the de-jitter buffer 129. The decoder 126 may retrieve stored audio frames from the de-jitter buffer 129 and decode the audio frames. When the decoder 126 determines that it is unable to decode a particular audio frame (or portion thereof) (e.g., because the frame or portion thereof is corrupted or not received), the decoder 126 may check the de-jitter buffer 129 for availability of a frame that includes redundant coding information for the corrupt/lost frame (e.g., a "future" frame that follows the corrupt/lost frame in an audio stream). If such a future frame is available, the decoder 126 may use redundant coding information from the future frame to reconstruct and decode the particular audio frame (or portion thereof). The system 100 of FIG. 1 may thus enable communication of redundant frame information that can be used to improve audio decoding performance in the presence of adverse network conditions.

It should be noted that in the above description, various functions performed by the system 100 of FIG. 1 are described as being performed by certain components or modules. However, this division of components and modules is for illustration only. In an alternate embodiment, a function performed by a particular component or module may instead be divided amongst multiple components or modules. Moreover, in an alternate embodiment, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a DSP, a controller, etc.), software (e.g., instructions executable by a processor), or any combination thereof.

Figure 2:
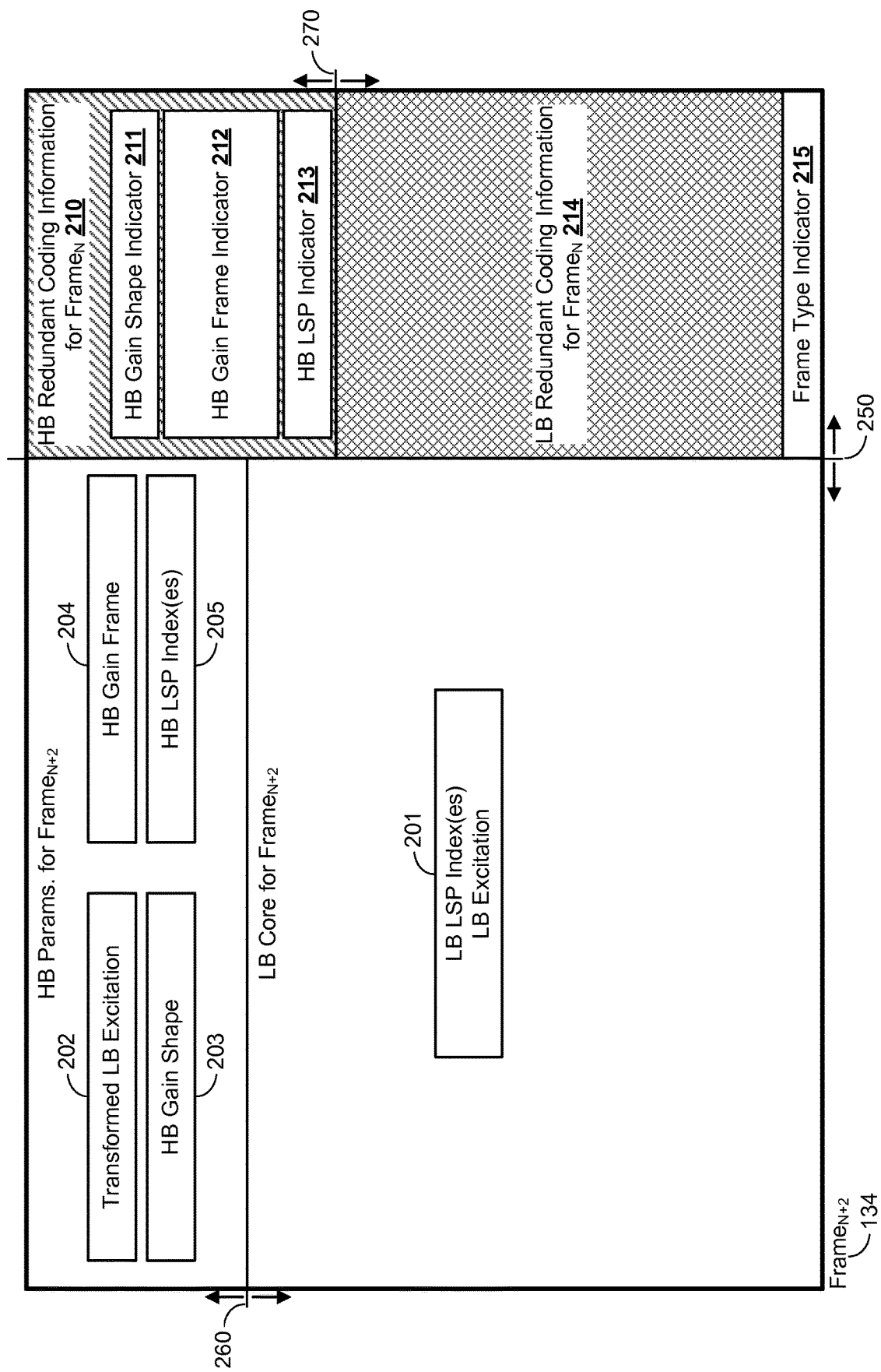
FIG. 2 is a diagram to illustrate a particular embodiment of an audio frame that includes redundant coding information for another audio frame.
Figure 3:
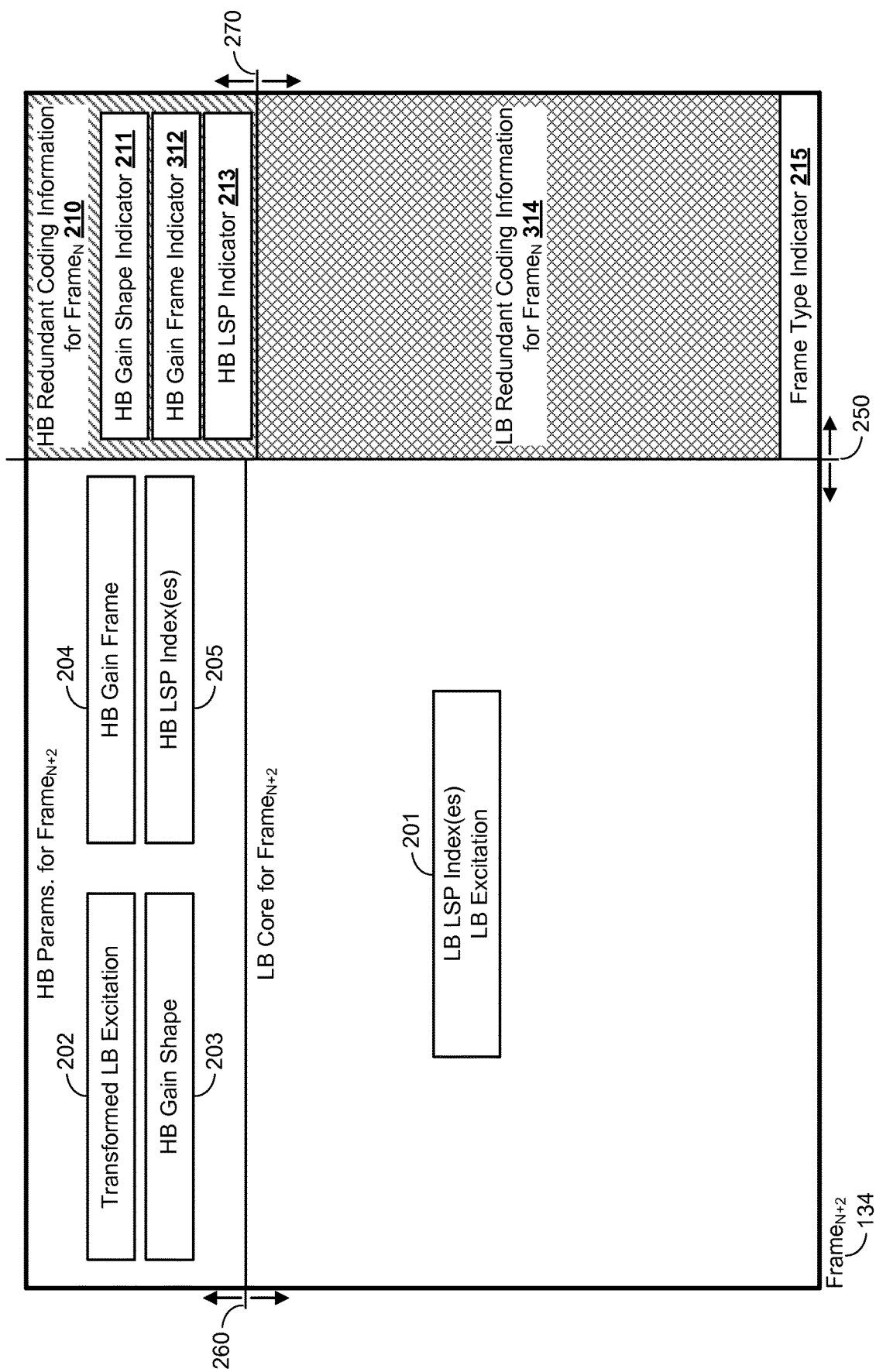
FIG. 3 is a diagram to illustrate another particular embodiment of an audio frame that includes redundant coding information for another audio frame.

Referring to FIG. 2 and FIG. 3, illustrative embodiments of the audio frame 134 are shown. The audio frame 134 may include an encoded LB portion, designated "LB core." The encoded LB portion may include LB linear prediction filter and excitation information. For example, the encoded low-band portion may include LB line spectral pair (LSP) index(es) and LB excitation 201. In alternative embodiments, the LB core of an audio frame may include different information. The audio frame 134 may also include HB parameters, designated "HB Params." The HB parameters occupy less space than the encoded LB core and include a set of parameters that can be used by a decoder, in accordance with an audio signal coding model, to reconstruct a HB portion of an audio frame. In the example of FIG. 2, the HB parameters may include a transformed LB excitation 202, a HB gain shape 203, a HB gain frame 204, and HB LSP index(es) 205. In alternative embodiments, an audio frame may include different HB parameters.

In a particular embodiment, the LB LSP index(es) and LB excitation 201, the transformed LB excitation 202, the HB gain shape 203, the HB gain frame 204, and the HB LSP index(es) 205 are generated during audio analysis at an encoder (e.g., the encoder 116 of FIG. 1 or an encoder 500 described with reference to FIG. 5). For example, an audio signal may be passed through an analysis filter bank that separates the audio signal into a LB signal and a HB signal. The LB and HB signals may or may not overlap. The LB signal may be input into a LP analysis module that encodes a spectral envelope of the LB signal as a set of LP coefficients (LPCs). A transform module may transform the LPCs into LSPs, which may alternately be referred to as line spectral pairs (LSPs). A quantizer may quantize the LSPs by identifying an entry of a LB LSP codebook that is "closest to" the LSPs. The quantizer may output the index of the entry in the codebook as the LB LSP index(es) shown at 201. The LB analysis module may also generate the LB excitation shown at 201 and the transformed LB excitation 202. For example, the LB excitation may be an encoded signal that is generated by quantizing a LP residual signal generated during the LP process performed by the LP analysis module. The LP residual signal may represent prediction error.

A HB analysis module may receive the HB signal from the analysis filter bank and the low-band excitation signal from the LB analysis module. The HB analysis module may generate the HB LSP index(es) 205 using a LPC coding, transform, and quantization process similar to the process described to generate the LB LSP index(es) and LB excitation 201. The HB LSP index(es) 205 may occupy fewer bits than the LB LSP index(es). The HB analysis module may also generate the HB gain shape 203 and the HB gain frame 204. The HB gain shape 203 and HB gain frame 204 may enable a decoder (e.g., the decoder 126 of FIG. 1 or a decoder described with reference to FIG. 6) to adjust HB gain shape and frame gain to more accurately reproduce the HB signal.

When communication of redundant frame coding information is enabled, the audio frame 134 further includes LB redundant coding information 214 and HB redundant coding information 210 for another audio frame. The audio frame 134 may also include a frame type indicator 215. As further described with reference to FIGS. 5-6, in an illustrative embodiment the frame type indicator 215 is a 3-bit indicator that indicates a frame type of the other audio frame and indicates how many bits of the audio frame 134 are allocated to the LB redundant coding information 214 and to the HB redundant coding information 210. In a particular embodiment, the LB redundant coding information 214 or the HB redundant coding information 210 may be optional. The HB redundant coding information 210 may include a HB gain shape indicator 211, a HB gain frame indicator 212, and a HB LSP indicator 213, as shown in FIG. 2. In alternative embodiments, the HB coding information 210 may include a different indicator or combination of indicators. For example, the HB LSP indicator 213 may be included in the HB redundant coding information 210 for super-wideband communication but may be omitted for wideband communication. As another example, the HB gain shape indicator 211 and/or the HB gain frame indicator 212 may be omitted for certain types of frames.

In a particular embodiment, the HB gain shape indicator 211 may be a single-bit indicator that is associated with a HB gain shape of a previous audio frame (e.g., frame$_N$ 132). The encoder may set a value of the HB gain shape indicator 211 based on a correlation between the HB portions of frame$_N$ 132 and frame$_{N+2}$ 134. For example, an inter-frame normalized HB correlation between frame$_N$ 132 and frame$_{N+2}$ 134 may be estimated based on the formula:

$$\frac{\sum_k x_N(k) x_{N+2}(k)}{\sum_k x_N^2(k)},$$

where $X_N(k)$ is a kth gain shape value for the Nth frame. In one example, a rolling window of one or more sub-frames may be used to determine four gain shape values per frame (e.g., k varies from 1 to 4). If the correlation value is larger than a threshold (e.g., 0.75), then the encoder sets the value of the HB gain shape indicator 211 to a first value (e.g., GS_bit=1). When the HB gain shape indicator 211 has the first value, the decoder may reuse the HB gain shape 203 of frame$_{N+2}$ 134 as an estimated HB gain shape of frame$_N$ 132 during redundant frame decoding/reconstruction of frame$_N$ 132. If the correlation value is smaller than the threshold, then the encoder sets the value of the HB gain shape indicator 211 to a second value (e.g., GS_bit=0). When the HB gain shape indicator 211 has the second value, the decoder may use a constant gain shape as the estimated gain shape, or may perform some other prediction method(s) to estimate the gain shape of frame$_N$ 132.

In a particular embodiment, the encoder may determine the value of the HB gain shape indicator 211 based on codebook index distance instead of, or in addition to, HB gain shape correlation. For example, the encoder may maintain or have access to a HB gain shape codebook that is used to quantize the HB gain shape information 203. The encoder may determine a first codebook index associated with the HB gain shape of frame$_N$ 132 and a second codebook index associated with the HB gain shape of frame$_{N+2}$ 134. The encoder may set the value of the HB gain shape indicator 211 (e.g., GS_bit=1 or GS_bit=0) based on a distance (e.g., a least means square error distance) between the codebook indexes.

The HB gain frame indicator 212 may be a single-bit indicator or a multi-bit indicator. In a particular embodiment, a size of the HB gain frame indicator 212 is dynamically adjusted by the encoder. For example, a packet-switched network may be used to transmit various types of audio frames, including voiced audio frames, generic audio frames, transition audio frames, and unvoiced audio frames. It may be useful to use a wider dynamic range for gain frame quantization of unvoiced frames than for voiced/generic/transition frames. Coarser gain frame quantization may be sufficient to effectively represent HB to LB gain ratio for voiced/generic/transition frames. Thus, if frame$_N$ 132 is an unvoiced frame, the encoder may allocate a first, larger number of bits (e.g., 3 to 6 bits) to the HB gain frame indicator 212. If frame$_N$ 132 is not an unvoiced frame, the encoder may allocate a second, smaller number of bits (e.g., 1 to 2 bits) to the HB gain frame indicator 212.

In the example shown in FIG. 2, the HB gain frame indicator 212 is allocated a larger number of bits (e.g., 3-6 bits). In contrast, FIG. 3 illustrates an example in which a HB gain frame indicator 312 is allocated a smaller number of bits (e.g., 1-2 bits) than the HB gain frame indicator 212 of FIG. 2. Because the HB gain frame indicator 312 is allocated a smaller number of bits, extra bits may be available for use in representing LB redundant coding information 314, which is larger than the LB redundant coding information 214 of FIG. 2. Alternatively, the extra bits may be allocated to the LB core or to the HB parameters of the frame$_{N+2}$ 134. In FIGS. 2-3, this flexibility in bit allocation is illustrated using three dividing lines 250, 260, and 270. The first dividing line 250 separates primary coding information from redundant coding information and may be adjusted left and right as an encoder dynamically adjusts the ratio of primary coding bits to redundant coding bits. The second dividing line 260 separates the LB core and the HB parameters within the primary coding information and may be adjusted up and down as an encoder dynamically adjusts the ratio of LB core bits to HB parameter bits within the primary coding information. The third dividing line 270 separates the LB redundant coding information and the HB redundant coding information and may be adjusted up and down as an encoder dynamically adjusts the ratio of HB redundant bits to that of LB redundant bits.

In a particular embodiment, the encoder may dynamically adjust the number of bits allocated to each of the four portions of the frame (e.g., dynamically "move" the dividing lines 250, 260, and/or 270) based on a "criticality" and/or frame type of frame$_N$ 132 and/or frame$_{N+2}$ 134. To illustrate, bit allocations between the four portions of the frame may be based on balancing a criticality of a previous frame (for which redundant coding information will be included in the frame) and audio degradation resulting from having fewer bits of the frame available to represent primary coding information for the frame. The inability to decode a certain type of frame may be more noticeable to a listener than the inability to decode another type of frame. Thus, certain frames of an audio signal may be considered to be more "critical" than other frames. For example, a first frame of an audio stream may have higher "criticality" than a second frame of the audio stream when erroneous decoding of the first frame is more likely to cause noticeable decoding artifacts than erroneous decoding of the second frame. More bits may be allocated to redundant coding information for a critical frame than are allocated to redundant coding information for a non-critical frame. Alternatively, or in addition, fewer bits of a critical frame may be allocated to redundant coding information than are allocated in a non-critical frame.

For example, speech frames may be classified into "all-predictive," "noise-excited linear prediction (NELP)," "generic," and "no-predictive" frame types. All-predictive frames may correspond to voiced speech and may constitute 50% or more of the active frames in an audio signal corresponding to speech-based communication. NELP frames may correspond to unvoiced data and may constitute 10%-20% of the frames. The remaining 30%-40% of the frames may be generic frames or no-predictive frames. Generic frames may be mixed mode frames that include both adaptive codebook (ACB) information and fixed codebook (FCB) information, such as codebook indexes. No-predictive frames may correspond to audio transitions and may include FCB information. Generic and no predictive frames may be more "self-contained" than all predictive and NELP frames. Accordingly, if a generic or no predictive frame is corrupt or not received, a decoder may be less able to rely on other frames to regenerate the frame. Consequently, generic and no predictive frames may be considered more critical, whereas all-predictive and NELP frames may be considered less critical for that particular frame (the impact of all-predictive and NELP frames may be different for a future frame).

In the example of FIG. 2, frame$_{N+2}$ 134 includes redundant coding information for frame$_N$ 132. If frame$_N$ 132 is considered critical, additional bits may be allocated to the redundant coding information (e.g., the first dividing line 250 may be adjusted to the left). If frame$_{N+2}$ 134 is considered critical, fewer bits may be allocated to redundant coding information (e.g., the first dividing line 250 may be adjusted to the right), so that a degradation in quality of frame$_{N+2}$ 134 can be reduced. Thus, in embodiments where frame$_{N+2}$ 134 is considered critical and frame$_N$ 132 is not considered critical, few or zero bits may be allocated for the redundant coding information. Conversely, in embodiments where frame$_{N+2}$ 134 is not considered critical and frame$_N$ 132 is considered critical, a large number of bits may be allocated for the redundant coding information. Accordingly, the number of bits allocated to HB parameters, LB core, LB redundant coding information, and/or HB redundant coding information may be determined based on a frame type of frame$_N$ 132 and/or a frame type of frame$_{N+2}$ 134.

In a particular embodiment, when the HB gain frame indicator 212 is allocated the first number of bits (e.g., 3-6 bits), the first number of bits is used to represent a codebook index. When the HB gain frame indicator 212 is allocated the second number of bits (e.g., 1 bit), the second number of bits is used to indicate which half of the codebook corresponds to the HB gain frame of frame$_N$ 132.

As an example, referring to FIG. 4, the audio frames 131-134 may have the HB gain frame values 1.6, 3.6, 1.6, and 1.0, respectively, and the HB gain frame codebook may include 8 indexes. If frame$_N$ 132 is an unvoiced frame, the HB gain frame indicator 212 is allocated three bits that are set to the value "100," i.e., which is the binary representation of the codebook index 4 corresponding to the HB gain frame value of 3.6. Otherwise, the HB gain frame indicator 212 is allocated one bit that is set to "1," indicating that the HB gain frame value of 3.6 is in a first portion (e.g., the higher half, corresponding to indexes 4-7) of the codebook. The value would be set to "0" if the HB gain frame value was in a second portion (e.g., the lower half, corresponding to indexes 0-3) of the codebook. The decoder may use a HB gain frame value for a previous frame (e.g., frame$_{N-1}$) along with the information that the HB gain frame value for frame$_N$ is in the higher half of the codebook to estimate a HB gain frame value for frame$_N$.

Thus, in a particular embodiment, the HB gain frame indicator 212 may be allocated and set by an encoder in accordance with the following C-style pseudocode:

```
/* If redundant frame type is NELP */
if( st->rf_frame_type == RF_NELP )
{
   /* Frame gain; potentially encoded using 5 bits for NELP frames */
   Step 1: Dequantize the redudant frame HB gain index;
   Step 2: convert the gain from log domian to real value (i.e., 10^gain) if
   needed;
}
Else /* If redundant frame type is ALL_PRED or GENERIC or
NO_PRED */
{
   smoothFactor = 0.0f;
   /* Frame gain */
   switch (gainIndex) /* encoded using 2 bits */
   {
   case 0:
      GainFrame = 0.5f; /* if the gain index is 0 */
      if(previous frame's gain <= 1.25) { smoothFactor = 0.8f; }
      break;
   case 1:
      GainFrame = 2.0f; /* if the gain index is 1 */
      if(previous frame's gain > 1.25 && <= 3) { smoothFactor = 0.8f; }
      break;
   case 2:
      GainFrame = 4.0f; /* if the gain index is 2 */
      if(previous frame's gain > 3 && <= 6) { smoothFactor = 0.8f; }
      break;
   case 3:
      VGainFrame = 8.0f; /* if the gain index is 3 */
         if(previous frame's gain > 6 && <= 16) { smoothFactor = 0.8f; }
         break;
   }
GainFrame = (1-smoothFactor)*GainFrame+smoothFactor*(previous
frame's gain);
}
```

The HB LSP indicator 213 may be a single-bit indicator that informs a receiver how to derive HB LSPs of frame$_N$ 132. To determine the value of the HB LSP indicator 213, the encoder may estimate an inter-frame HB LSP variation using a spectral distortion metric between frame$_N$ 132 and frame$_{N+2}$ 134. Alternately, or in addition, a codebook index distance between HB LSP index(es) of the audio frames may be used. When spectral variation between frame$_N$ and frame$_{N+2}$ is less than a particular threshold (e.g., 2 decibels (dB)), the encoder may set the HB LSP indicator 213 to a first value (e.g., HBLSP_bit=0). When the HB LSP indicator 213 has the first value, the decoder may use HB LSP index(es) 205 of frame$_{N+2}$ as estimated HB LSP index(es) of frame$_N$. When spectral variation is greater than or equal to the particular threshold (e.g., 2 dB), the encoder may set the HB LSP indicator 213 to a second value (e.g., HBLSP_bit=1). When the HB LSP indicator 213 has the second value, the decoder may derive the HB LSP index(es) for frame$_N$ by interpolation or extrapolation. For example, if the spectral variation is within a threshold range (e.g., 2 dB<variation<4 dB), the decoder may derive the HB LSP index(es) for frame$_N$ by interpolating HB LSPs from frame$_{N-1}$ to frame$_{N+2}$. If the spectral variation is outside the threshold range (e.g., >=4 dB), the decoder may derive the HB LSP index(es) for frame$_N$ by extrapolating from previous frames (e.g., frame$_{N-1}$ and frame$_{N-2}$).

In an alternate embodiment, to set a value of the HB LSP indicator 213, an encoder may determine a difference (e.g., delta) between the HB LSPs of frame$_N$ and frame$_{N+2}$. The encoder may set the value of the HB LSP indicator 213 based on the difference, and the decoder may use the value of the HB LSP indicator 213 to derive the HB LSPs of frame$_N$ from the HB LSPs of frame$_{N+2}$. In an alternate embodiment, the HB LSP indicator 123 is not included in the redundant coding information.

Thus, as described with reference to FIGS. 2-4, an encoder may dynamically adjust how much space is occupied by the HB redundant coding information 210 and may set values of the HB redundant coding information 210 to enable a decoder to reconstruct a lost frame (or a portion thereof).

Figure 5:
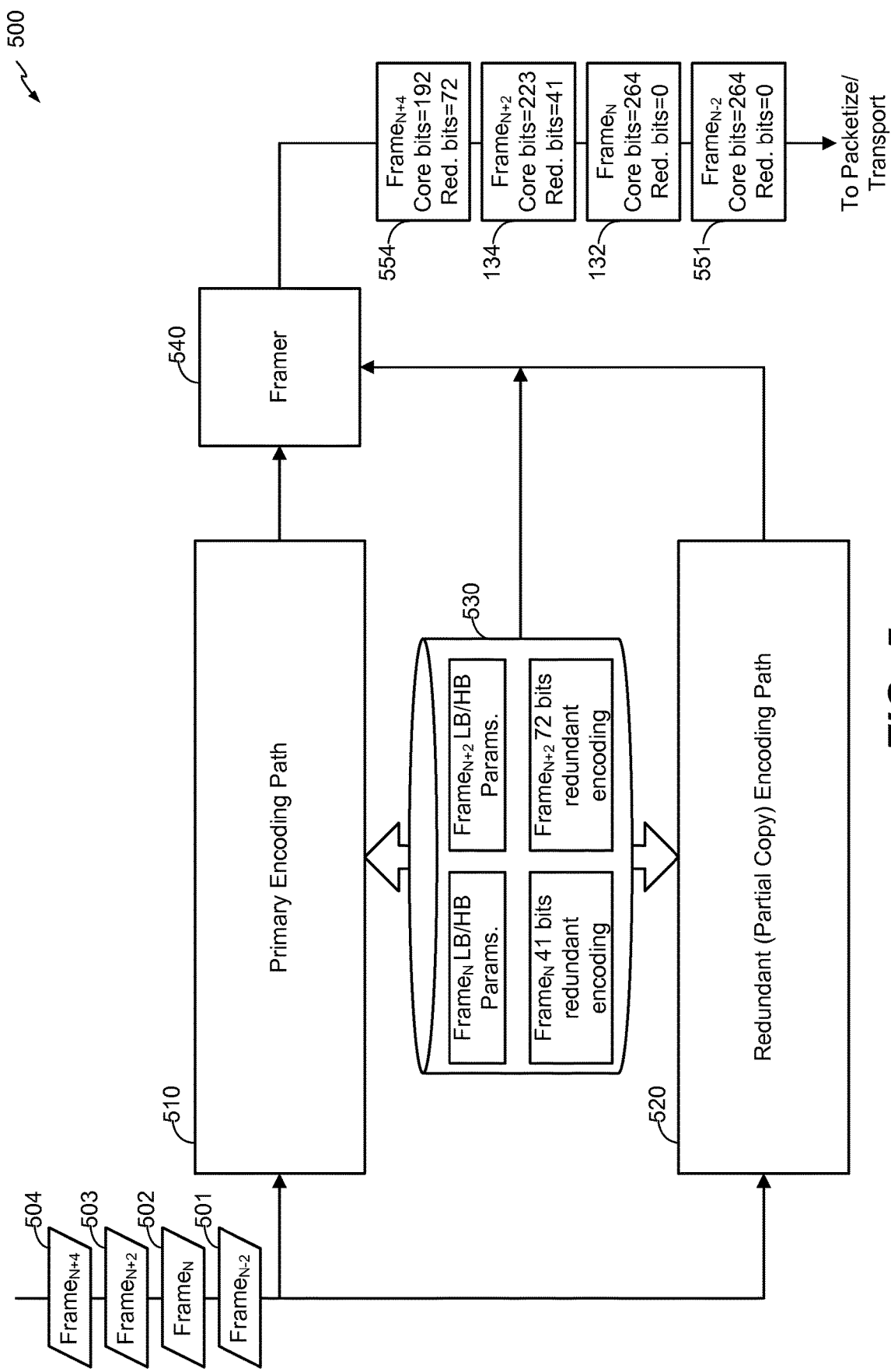
FIG. 5 is a diagram to illustrate a particular embodiment of a parallel-path encoder configured to encode redundant frame information.

Referring to FIG. 5, a particular embodiment of an encoder 500 is shown. In an illustrative embodiment, the encoder 500 corresponds to the encoder 116 of FIG. 1. The encoder 500 includes two encoding paths that operate in parallel: a primary encoding path 510 and a redundant (alternatively referred to as "partial copy") encoding path 520. The encoding paths 510, 520 are coupled to a framer (or bit multiplexer) 540. In FIG. 5, the encoding paths 510, 520 are configured to communicate via a shared memory 530. The shared memory 530 may correspond to cache-based memory, register-based memory, or other memory of a processor (e.g., a DSP). In alternative embodiments, the encoding paths 510, 520 may communicate using another mechanism.

During operation, frame data for each audio frame to be encoded may be provided to both the primary encoding path 510 and the redundant encoding path 520. For example, FIG. 5 illustrates that frame data 501, 502, 503, and 504 for frame$_{N-2}$ 551, frame$_N$ 132, frame$_{N+2}$ 134, and frame$_{N+4}$ 554, respectively, is provided to both encoding paths 510, 520. Frame data for intervening frames (e.g., frame$_{N-1}$ 131, frame$_{N+1}$ 133, and frame$_{N+3}$) is not shown for ease of illustration. The primary encoding path 510 may generate primary coding information for audio frames and the redundant encoding path 520 may generate redundant information for audio frames. The bit multiplexer or framer 540 may concatenate bits received from the encoding paths 510, 520 to generate encoded audio frames. In the example of FIG. 5, the framer 540 generates frame$_{N-2}$ 551, frame$_N$ 132, frame$_{N+2}$ 134, and frame$_{N+4}$ 554, each of which is provided to a packetization and transport system for communication to a destination device.

Encoding operations performed by the primary encoding path 510 may depend on encoding operations performed by the redundant encoding path 520, and vice versa. To illustrate, the encoder 500 may encode audio frames at a bitrate of 13.2 kbps and each frame may include 264 bits (in alternative embodiments, a different bitrate and a different numbers of bits may be used). The primary encoding path 510 may determine how many of the 264 bits are available to encode the primary coding information (e.g., LB core and HB parameters) of a frame based on how many bits the redundant encoding path 520 used to encode redundant coding information for a previous frame. The redundant encoding path 520 may encode redundant coding information for a frame based on parameters determined by the primary encoding path 510 during primary encoding of the frame. Thus, as shown using the shared memory 530 of FIG. 5, the primary encoding path 510 may communicate LB/HB parameters to the redundant encoding path 520, and the redundant encoding path 520 may communicate the number of bits used to perform redundant encoding of a frame to the primary encoding path 510.

When the primary encoding path 510 receives the frame data 501 for frame$_{N-2}$ 551, the primary encoding path 510 may determine how many bits the redundant encoding path 520 used to perform redundant encoding of frame$_{N-4}$ (not shown). In the example of FIG. 5, redundant encoding was not performed for frame$_{N-4}$. Thus, the primary encoding path 510 may allocate all 264 available bits to primary coding information generated from the frame data 501, and frame$_{N-2}$ 551 may include the 264 encoded bits received from the primary encoding path 510. To illustrate, as described with reference to FIGS. 2-3, the 264 bits may include LSP indexes, ACB information, FCB information, excitation information, transformed excitation information, gain shape information, and/or gain frame information, among other alternatives. In parallel with the operations performed by the primary encoding path 510 for the frame data 501, the redundant encoding path 520 may determine how many bits to use for redundant encoding of frame$_{N-2}$ 551. In the example of FIG. 5, redundant encoding of frame$_{N-2}$ 551 is not performed (e.g., frame$_{N-2}$ 551 is determined to be "non-critical"). In an illustrative embodiment, the redundant encoding path 520 determines how many bits to use for redundant encoding of a frame based on a frame type of the frame. For example, 41 bits may be used for redundant encoding of a NELP frame, 58 bits may be used for redundant coding of an all-predictive frame, and 72 bits may be used for redundant coding of a generic frame (in alternative embodiments a different number of bits may be used for various frame types). The particular LB/HB redundant frame information that is represented when 41 bits are used, when 58 bits are used, when 72 bits are used, etc. may be specified in an industry standard (e.g., the $3^{rd}$ Generation Partnership Project (3GPP) EVS standard).

When the primary encoding path 510 receives the frame data 502 for frame$_N$ 132, the primary encoding path 510 may determine how many bits the redundant encoding path 520 used to perform redundant encoding of frame frame$_{N-2}$ 551. Because redundant encoding was not performed for frame$_{N-2}$ 551, primary encoding path 510 may use all 264 available bits to represent the LB core and HB parameters derived from the frame data 502, and frame$_N$ 132 output by the framer 540 may include the 264 encoded bits received from the primary encoding path 510. The redundant encoding path 520 may use 41 bits to perform redundant encoding for frame$_N$ 132 (e.g., frame$_N$ 132 may be a NELP frame). In particular, the 41 bits may be used to represent certain "critical" LB/HB parameters that are determined by the primary encoding path 510 during the primary encoding for frame$_N$ 132. To illustrate, as described with reference to FIGS. 2-3, redundant coding information may include gain shape information, gain frame information, and/or LSP information, among other alternatives. The 41-bit redundant coding for frame$_N$ 132 may be stored (e.g., in the shared memory 530) for subsequent use.

When the primary encoding path 510 receives the frame data 503 for frame$_{N+2}$ 134, the primary encoding path 510 may determine (e.g., based on data stored in the shared memory 530), that 41 bits were used for redundant encoding of frame$_N$ 132. Thus, the primary encoding path 510 may use 264−41=223 bits to encode LB core and HP parameter information for frame$_{N+2}$ 134. The redundant encoding path 520 may determine to use 72 bits to perform redundant encoding for frame$_{N+2}$ 134 (e.g., frame$_{N+2}$ 134 may be a generic frame). The 72-bit redundant coding for frame$_{N+2}$ 134, which may represent selected parameters for frame$_{N+2}$ 134 that are determined by the primary encoding path 510, may be stored for subsequent use. The framer 540 may concatenate the 223-bit primary encoding received from the primary encoding path 510 with the previously stored 41-bit redundant coding for frame$_N$ 132 to generate frame$_{N+2}$ 134, as shown.

When the primary encoding path 510 receives the frame data 504 for frame$_{N+4}$ 554, the primary encoding path 510 may determine that 72 bits were used for redundant encoding of frame$_{N+2}$ 134. Thus, the primary encoding path 510 may use 264−72=192 bits to encode LB core and HP parameter information for frame$_{N+4}$ 554. In parallel, the redundant encoding path 520 may perform redundant encoding for frame$_{N+4}$ 554. The framer 540 may concatenate the 192-bit primary encoding received from the primary encoding path 510 with the previously stored 72-bit redundant coding for frame$_{N+2}$ 134 to generate frame$_{N+4}$ 554, as shown.

In a particular embodiment, the last three bits of an encoded frame represent a frame type indicator for redundant coding data included in the frame. For example, because frame$_{N-2}$ 551 and the encoded frame$_N$ 132 do not include any redundant coding information for another frame, the last three bits of frame$_{N-2}$ 551 and frame$_N$ 132 may have a first value (e.g., 000). Because frame$_{N+2}$ 134 includes 41 bits of redundant coding information and frame$_N$ is a NELP frame, the last three bits of frame$_{N+2}$ 134 may have a second value (e.g., 001 or another unique 3-bit value). Because frame$_{N+4}$ 554 includes 72 bits of redundant coding information and frame$_{N+2}$ 134 is a generic frame, the last three bits of frame$_{N+4}$ 554 may have a third value (e.g., 010 or another unique 3-bit value). Additional values of the 3-bit frame type indicator may be used to indicate other frame types and to signal other information (e.g., frequency-domain partial copies). Thus, in the described example, the last three bits of each frame indicate a frame type of a previous frame and how many bits of redundant coding information for the previous frame are included in the frame. Accordingly, 261 bits out of the 264 bits may be shared between the primary encoding path 510 and the redundant encoding path 520, and the remaining 3 bits may be reserved for the redundant frame type indicator.

Figure 6:
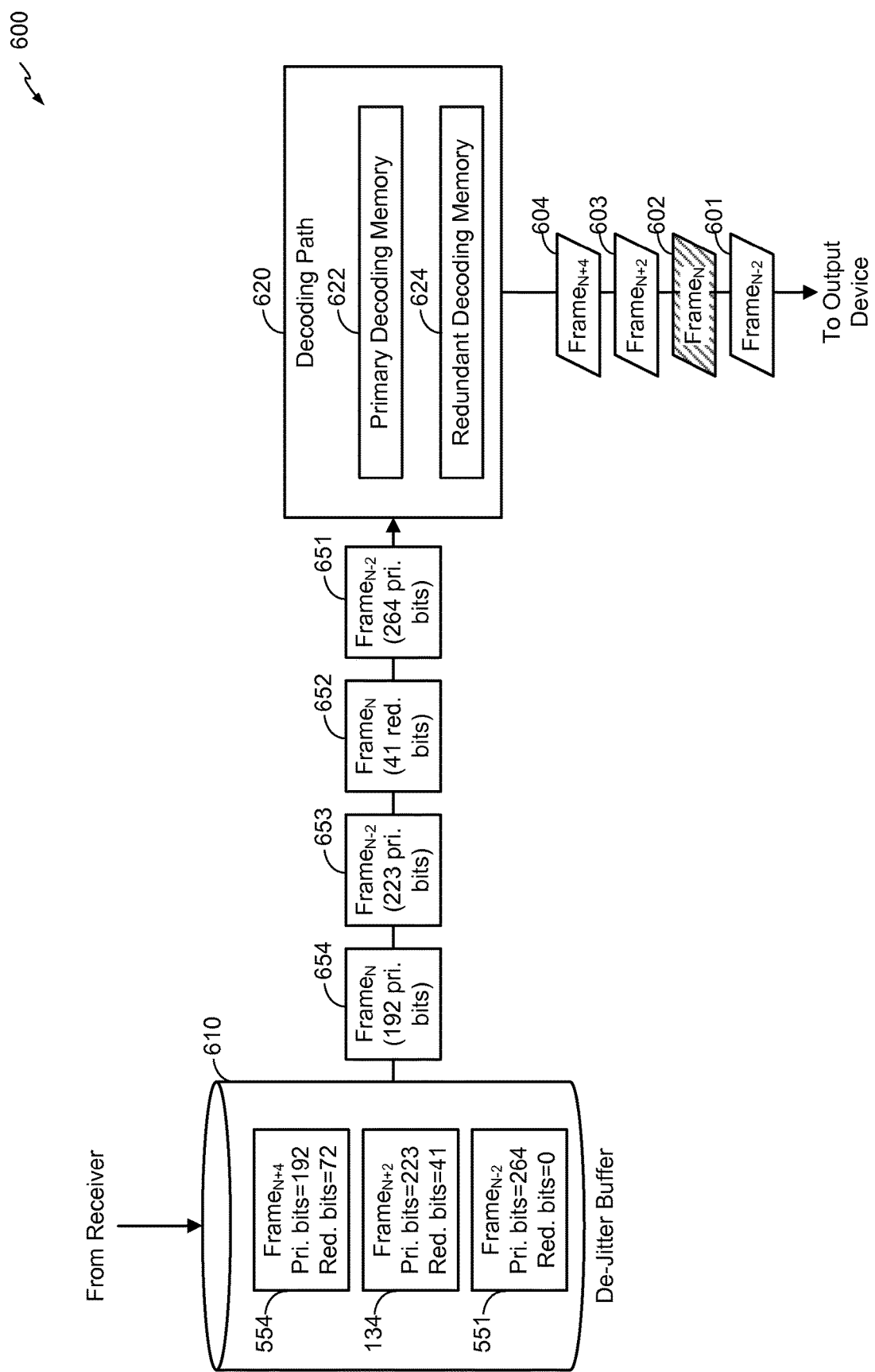
FIG. 6 is a diagram to illustrate a particular embodiment of a single path decoder configured to decode redundant frame information.

Encoded audio frames may be transmitted by a source device (e.g., the first computing device 110 of FIG. 1) to a destination device (e.g., the second computing device 120 of FIG. 1), which may decode the received audio frames. For example, FIG. 6 illustrates a particular embodiment of a decoder 600 that is operable to decode received audio frames. The decoder 600 may correspond to the decoder 126 of FIG. 1. The decoder 600 includes a de-jitter buffer 610 (e.g., corresponding to the de jitter buffer 129 of FIG. 1). Whereas the encoder 500 includes parallel encoding paths 510-520, the decoder 600 includes a single decoding path 620.

As audio frames are received by a receiver, the audio frames may be stored in the de-jitter buffer 610. As described with reference to FIG. 1, due to network conditions, frames sent by a source device to a destination device may arrive out of order, may be corrupted, or may not arrive at all. The decoding path 620 may retrieve frames from the de-jitter buffer 610 according to a frame sequence (e.g., based on frame sequence numbers or other sequencing information included in the audio frames). For example, the decoding path 620 may attempt to retrieve and decode frame$_{N-2}$ 551 prior to frame$_N$ 132, frame$_N$ 132 prior to frame$_{N+2}$ 134, and frame$_{N+2}$ 134 prior to frame$_{N+4}$ 554. For ease of illustration, decoding of intervening frames (e.g., frame$_{N-1}$ 131, frame$_{N+1}$ 133, and frame$_{N+3}$) is not shown in FIG. 6.

To initiate decoding of frame$_{N-2}$ 551, the decoding path 620 may check whether frame$_{N-2}$ 551 is available in the de-jitter buffer 610. In the example of FIG. 6, frame$_{N-2}$ 551 is available in the de jitter buffer 610. The decoding path 620 may determine how many bits of frame$_{N-2}$ 551 are being used for redundant coding information of another frame. For example, based on the last three bits of frame$_{N-2}$ 134 having the value 000 (as described with reference to FIG. 5), the decoding path 620 may determine that no bits of frame$_{N-2}$ 134 represent redundant frame information. Thus, the decoding path 620 may retrieve all 261 bits of frame$_{N-2}$ 551, as shown at 651, and may generate decoded data 601. The decoded data 601 may be provided to an output device (e.g., a speaker) for playback. It will be appreciated that depending on the quality of the encoding performed at the encoder 500 and the quality of the decoding performed at the decoder 600, the data 601 may be identical to or an approximation of the data 501 of FIG. 5. During the decoding of frame$_{N-2}$ 551 based on the 261 primary bits, values of particular decoding parameters may be stored in a primary decoding memory 622 for use during decoding of a subsequent frame.

In the example of FIG. 6, frame$_N$ 132 is not available in the de-jitter buffer 610. Alternatively, the decoding path 620 may determine that frame$_N$ 132 is available in the de-jitter buffer 610, but an error may occur during decoding of the primary bits of frame$_N$ 132. In either case, the decoding path 620 may check whether redundant frame information for frame$_N$ 132 is available in the de-jitter buffer 610. For example, based on a known offset of 2 frames between primary coding information and redundant coding information (other offsets, e.g., 3 or 5 or 7 may be used in other embodiments), the decoding path 620 may check whether frame$_{N+2}$ 134 is available in the de jitter buffer 610. If frame$_{N+2}$ 134 is also unavailable, the decoding path 620 may initiate an error concealment procedure to generate decoded data 602 for frame$_N$ 132. In the example of FIG. 6, however, frame$_{N+2}$ 134 is available in the de-jitter buffer 610. Based on the last three bits of frame$_{N+2}$ 134 having the value 001 (as described with reference to FIG. 5), the decoding path 620 may determine that 41 bits of frame$_{N+2}$ 134 represent redundant coding information for frame$_N$ 132. The decoding path 620 may retrieve the 41 redundant coding bits for frame$_N$ 132, as shown at 652, and may generate the data 602. Thus, the decoding path 620 may determine how many redundant coding bits are available and retrieve the redundant coding bits based on the determined number (e.g., when X redundant coding bits are available, the decoding path 620 may retrieve that last X bits of a frame or packet that is stored in the de-jitter buffer 610 associated with a packet sequence number determined by the OFFSET). In FIG. 6, decoded data generated from redundant frame information (e.g., the data 602) is shown using a hatched pattern. During the decoding of frame$_N$ 132 based on the 41 bits of redundant coding information, values of certain parameters may be stored in a redundant decoding memory 624 for subsequent use. In an alternate embodiment, the redundant decoding memory 624 and the primary decoding memory 622 may overlap or may be the same.

Thus, the decoding path 620 may maintain separate memories for decoding based on primary bits and decoding based on redundant bits. In a particular embodiment, data in the primary decoding memory 622 may be used during decoding of other primary bits but not during decoding of redundant bits. Similarly, data from the redundant decoding memory 624 may be used during decoding of redundant bits, but not during decoding of primary bits. In an alternative embodiment, data from the primary decoding memory 622 may be used during decoding of redundant bits and/or data from the redundant decoding memory 624 may be used during decoding of primary bits. For example, parameters from multiple previously decoded frames may be used during interpolation and/or prediction of a parameter for a "current" frame.

The decoding path 620 may decode $frame_{N+2}$ 134 and $frame_{N+4}$ 554, which are available in the de-jitter buffer 610, as described for $frame_{N-2}$ 551. Based on the last three bits of $frame_{N+2}$ 134 having the value 001 (as described with reference to FIG. 5), the decoding path 620 may retrieve 264−41=223 primary bits of $frame_{N+2}$ 134, as shown at 653, to generate decoded data 603. Based on the last three bits of $frame_{N+4}$ 554 having the value 010 (as described with reference to FIG. 5), the decoding path 620 may retrieve 264−72=192 primary bits of $frame_{N+4}$ 134, as shown at 653, to generate decoded data 604.

It should be noted that the decoder 600 may also use a partial copy frame type indicator when performing decoding operations in "clean channel" conditions. For example, when the $frame_N$ 132 is received at the de-jitter buffer 610, a frame erasure condition may not exist for the $frame_N$ 132. Nonetheless, the decoder 600 may evaluate the frame type indicator to determine how many bits of the $frame_{N+2}$ 134 are primary coding bits and how many bits of the $frame_{N+2}$ 134 are partial copy bits for the $frame_N$ 132. The decoding path 620 may decode the $frame_{N+2}$ 134 based on the primary coding bits. The partial copy bits for the $frame_N$ 132 may be discarded, because the $frame_N$ 132 may have been successfully received and decoded prior to decoding of the $frame_{N+2}$ 134. Thus, redundant frame information may be processed by the decoder 600 in noisy channel conditions (during which a frame may be dropped and reconstructed) as well as in clean channel conditions.

It should be noted that for ease of explanation, the encoding paths 510, 520 of FIG. 5 and the decoding path 620 of FIG. 6 are illustrated as block components. However, it is to be understood that the primary encoding path 510, the redundant encoding path 520, and/or the decoding path 620 may include sub-components that are operable to perform encoding and/or decoding operations described with reference to FIGS. 1-4. For example, one or more of the paths 510, 520, or 620 may include an analysis filter bank, a LP analysis module, a transform module, a quantizer, a HB analysis module, ACBs, FCBs, etc. In particular embodiments, one or both of the encoding paths 510-520 may include decoding components that are also included in the decoding path 620 (e.g., as a "local decoder" of the encoder 500).

FIGS. 5-6 thus illustrate examples of an encoder 500 and a decoder 600 that may be used to encode and decode redundant frame information. Communicating redundant coding bits for a frame in a subsequent frame may improve audio reconstruction (e.g., synthesis) at a destination device in the presence of adverse network conditions. For example, redundant encoding bits may be used to reconstruct a frame when the frame is not received at a destination device. As another example, when an error occurs while decoding primary bits for a frame, redundant encoding bits for the frame may be retrieved from another frame and may be used instead of, or in conjunction with, the primary bits.

Referring to FIGS. 7-8, a flowchart of a particular embodiment of a method of decoding a frame based on redundant coding information included in a subsequent frame is shown and generally designated 700. In an illustrative embodiment, the method 700 may be performed at a destination device (e.g., the second computing device 120 of FIG. 1) and/or a decoder (e.g., the decoder 600 of FIG. 6).

The method 700 includes receiving a second audio frame at a decoder (e.g., via a packet-switched network), at 702. The second audio frame follows a first audio frame in an audio signal. The second audio frame includes a first number of bits allocated to primary coding information associated with the second audio frame, a second number of bits allocated to redundant coding information associated with the first audio frame, and an indicator of a frame type of the first audio frame. For example, in FIG. 6, the decoder 600 may receive $frame_{N+2}$ 134, which follows $frame_N$ 132 in an audio signal.

The method 700 also includes storing the second audio frame in a de-jitter buffer, at 704. For example, in FIG. 6, $frame_{N+2}$ 134 may be stored in the de-jitter buffer 610. The method 700 includes determining whether a frame erasure condition is associated with the first audio frame, at 706. In response to determining that a frame erasure condition is associated with the first audio frame (e.g., the first audio frame was dropped or corrupted due to poor channel conditions), the method 700 further includes determining, based on the indicator, the second number of bits of the second audio frame that are allocated to the redundant coding information associated with the first audio frame, at 708. For example, in FIG. 6, the decoding path 620 may determine that $frame_N$ 132 is not available in the de-jitter buffer 610 and may determine, based on a frame type indicator in $frame_{N+2}$ 134, that 41 bits of $frame_{N+2}$ 134 represent redundant coding information for $frame_N$ 132.

The method 700 includes decoding the first audio frame based on the redundant coding information, at 710. For example, in FIG. 6, the decoding path 620 may decode the missing $frame_N$ 132, or an approximation thereof, based on the 41 bits of redundant coding information included in $frame_{N+2}$ 134.

When a frame erasure condition is not associated with the first audio frame, the method 700 includes decoding the first audio frame based on primary coding information in the first audio frame, at 712. For example, in clean channel conditions, the $frame_N$ 132 frame may have previously been received and stored in the de-jitter buffer 610, and the decoding path 620 may decode the $frame_N$ 132 based on primary coding bits of the $frame_N$ 132.

Regardless of whether the first audio frame is decoded using redundant coding information or primary coding information, the method 700 may include determining, based on the indicator, the first number of bits of the second audio frame that are allocated to the primary coding information associated with the second audio frame, at 714. The method 700 may also include decoding the second audio frame based on the primary coding information, at 716.

A particular example of one or more operations that may be performed during decoding of the first audio frame (e.g., $frame_N$ 132) based on the redundant coding information included in the second audio frame (e.g., $frame_{N+2}$ 134) is further described with reference to FIG. 8. Thus, one or more operations illustrated in FIG. 8 may be performed as part of the operation 710 of FIG. 7. In some embodiments, one or more operations shown in FIG. 8 may be omitted. It is noted that FIG. 8 illustrates HB decoding based on redundant frame information. Although not shown in FIG. 8, LB decoding based on redundant frame information may also be performed at a decoder during operation 710 of FIG. 7.

The decoder may determine a value of a gain shape indicator included in the redundant coding information, at 810. When the gain shape indicator has a first value, the decoder may use the high-band gain shape of the second audio frame as the estimated gain shape of the first audio frame, at 812. For example, referring to FIGS. 2-3, the decoder may use the HB gain shape 203. When the gain shape indicator has a second value, the decoder may use a constant gain shape as the estimated gain shape or some other prediction method(s) to estimate the gain shape of the first audio frame, at 814.

The decoder may also determine how many bits are allocated to a HB gain frame indicator in the redundant coding information, at 820. When a first (e.g., larger) number of bits are allocated, the decoder may determine a HB gain frame of the first audio frame by using the HB gain frame indicator as a codebook index, at 822. When a second (e.g., smaller) number of bits are allocated, such as a single bit, the decoder may determine the HB gain frame of the first audio frame by accessing an indicated portion (e.g., upper or lower half) of the codebook, at 824.

The decoder may further determine a value of a HB LSP indicator, at 830. When the HB LSP indicator has a first value, the decoder may use the HB LSP index(es) (or HB LSPs) of the second audio frame as estimated HB LSP index(es) (or HB LSPs) of the first audio frame, at 832. When the HB LSP indicator has a second value, the decoder may determine whether a spectral distortion between the first and second audio frames is within a threshold range, at 834. When the spectral distortion is within the threshold range, the decoder may determine HB LSP index(es) (or HB LSPs) of the first audio frame via interpolation (e.g., interpolating between $frame_{N-1}$ 131 and $frame_{N+2}$ 134), at 836. When the spectral distortion is outside the threshold range, the decoder may determine HB LSP index(es) (or HB LSPs) of the first audio frame via extrapolation (e.g., extrapolating from $frame_{N-2}$ 551 and $frame_{N-1}$ 131), at 838.

In particular embodiments, the method 700 of FIGS. 7-8 may be implemented via hardware (e.g., a FPGA device, an ASIC, etc.) of a processing unit such as a CPU, a DSP, or a controller, via a firmware device, or any combination thereof. As an example, the method 700 of FIGS. 7-8 can be performed by a processor that executes instructions, as described with respect to FIG. 10.

Referring to FIG. 9, a flowchart of a particular embodiment of a method of encoding redundant coding information for a frame into a subsequent frame is shown and generally designated 900. In an illustrative embodiment, the method 900 may be performed at a source device (e.g., the first computing device 110 of FIG. 1) and/or an encoder (e.g., the encoder 500 of FIG. 5).

The method 900 includes encoding and transmitting a first audio frame of an audio signal, at 902. For example, in FIG. 5, the encoder 500 may encode and transmit $frame_N$ 132. The method 900 also includes determining, based on a frame type of the first audio frame, a first number of bits of a second audio frame to allocate to primary coding information associated with the second audio frame, at 904. The second audio frame follows the first audio frame in the audio signal. A second number of bits of the second audio frame to allocate to redundant coding information associated with the first audio frame is also determined. For example, as shown in FIG. 5, the encoder may determine, based on a frame type of $frame_N$ 132, that 41 bits of $frame_{N+2}$ 134 are to be allocated to redundant coding information for frame $frame_N$ 132 and that 223 bits of $frame_{N+2}$ 134 are to be allocated to primary coding information for $frame_{N+2}$ 134.

The method 900 includes encoding the second audio frame, at 906. The second audio frame includes the first number of bits of primary coding information, the second number of bits of redundant coding information, and an indicator of the frame type of the first audio frame.

For example, an encoder may set a value of a single-bit gain shape indicator, at 908. The value may be set based on a correlation between the HB portions of the first and second audio frames and/or a distance between codebook indexes associated with HB gain shapes of the first and second audio frames.

The encoder may allocate a particular number of bits to a HB gain frame indicator, at 910. The particular number of bits may be determined based on whether the first audio frame is an unvoiced frame. The encoder may also set the allocated bits to a particular value based on a codebook (e.g., the HB gain frame codebook shown in FIG. 4).

The encoder may set a value of a single-bit HB LSP indicator based on a spectral distortion between the first and second audio frames and/or a distance between codebook indexes associated with HB LSPs of the first and second audio frames, at 912. Alternately, the encoder may determine a difference (e.g., delta) between high-band LSPs of the first and second audio frames and set a value of the HB LSP indicator based on the difference, at 914. In alternative embodiments, different redundant coding information may be determined by the encoder. Moreover, it should be noted that the aforementioned examples of certain types of indicators being single-bit or multi-bit is for example only, and is not to be considered limiting. In alternative embodiments different types of primary and/or redundant coding information may be represented using a different number of bits.

The method 900 further includes transmitting the second audio frame, at 916. For example, in FIG. 1, the transmitter 118 may transmit $frame_{N+2}$ 134 to the receiver 128, where $frame_{N+2}$ 134 includes redundant coding information for $frame_N$ 132.

In particular embodiments, the method 900 of FIG. 9 may be implemented via hardware (e.g., a FPGA device, an ASIC, etc.) of a processing unit such as a CPU, a DSP, or a controller, via a firmware device, or any combination thereof. As an example, the method 900 of FIG. 9 can be performed by a processor that executes instructions, as described with respect to FIG. 10.

It should be noted that the order of operations illustrated in FIGS. 7-9 is for illustrative purposes only and is not to be considered limiting. In alternative embodiments, certain operations may be performed in a different order and/or may be performed concurrently with each other (or at least partially concurrently).

Referring to FIG. 10, a block diagram of a particular illustrative embodiment of a wireless communication device is depicted and generally designated 1000. The device 1000 includes a first processor 1010 (e.g., a CPU) coupled to a memory 1032 (e.g., a computer-readable storage device). The device 1000 also includes a second processor 1080 (e.g., a DSP). The memory 1032 may include instructions 1060 executable by the first processor 1010 and/or the second processor 1080 to perform methods and processes disclosed herein, such as the methods of FIGS. 7-9.

The second processor 1080 may include a speech encoder 1087, a speech decoder 1088, and a memory 1085 that stores one or more codebooks 1086 (e.g., a LB LSP codebook, a HB LSP codebook, a HB gain shape codebook, a HB gain frame codebook, etc.). The one or more codebooks 1086 may include ACBs, FCBs, or both. In an illustrative embodiment, the speech encoder 1087 is the encoder 116 of FIG. 1 and/or the encoder 500 of FIG. 5, the speech decoder 1088 is the decoder 126 of FIG. 1 and/or the decoder 600 of FIG. 6, and the memory 1085 includes the de-jitter buffer 129 of FIG. 1, the shared memory 530 of FIG. 6, and/or the de-jitter buffer 610 of FIG. 6. In alternative embodiments, the speech encoder 1087 and/or the speech decoder 1088 may be external to the second processor 1088 (e.g., may be included in the first processor 1010 or in a different processor or hardware block). The speech encoder 1087 and speech decoder 1088 may be implemented via dedicated hardware (e.g., circuitry), by a processor executing instructions to perform one or more tasks, or a combination thereof. As an example, the memory 1032 or the memory 1085 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or an optical disc memory (e.g., compact disc read only memory (CD-ROM), digital video disc (DVD), blu-ray disc, etc.). The memory device may include instructions (e.g., the instructions 1060) that, when executed by a computer (e.g., the first processor 1010 and/or the second processor 1080), cause the computer to perform various operations described herein.

FIG. 10 also shows a display controller 1026 that is coupled to the first processor 1010 and to a display 1028. A coder/decoder (CODEC) 1034 may be coupled to the first processor 1010 and to the second processor 1080, as shown. A speaker 1036 and a microphone 1038 can be coupled to the CODEC 1034. In a particular embodiment, the CODEC 1034 is an analog audio-processing front-end component. For example, the CODEC 1034 may perform analog gain adjustment and parameter setting for signals received from the microphone 1038 and signals transmitted to the speaker 1036. The CODEC 1034 may also include analog-to-digital (A/D) and digital-to-analog (D/A) converters. In a particular example, the CODEC 1034 also includes one or more modulators and signal processing filters. In selected embodiments, the CODEC 1034 includes a memory to buffer input data received from the microphone 1038 and to buffer output data that is to be provided to the speaker 1036.

FIG. 10 also indicates that a wireless controller 1040 can be coupled to the first processor 1010 and to an antenna 1042. In a particular embodiment, the first processor 1010, the second processor 1080, the display controller 1026, the memory 1032, the CODEC 1034, and the wireless controller 1040 are included in a system-in-package or system-on-chip device (e.g., a mobile station modem (MSM)) 1022. In a particular embodiment, an input device 1030, such as a touchscreen and/or keypad, and a power supply 1044 are coupled to the system-on-chip device 1022. Moreover, in a particular embodiment, as illustrated in FIG. 10, the display 1028, the input device 1030, the speaker 1036, the microphone 1038, the antenna 1042, and the power supply 1044 are external to the system-on-chip device 1022. However, each of the display 1028, the input device 1030, the speaker 1036, the microphone 1038, the antenna 1042, and the power supply 1044 can be coupled to a component of the system-on-chip device 1022, such as an interface or a controller.

In conjunction with the described embodiments, an apparatus is disclosed that includes means for receiving a second audio frame, where the second audio frame follows a first audio frame in an audio signal. The second audio frame includes a first number of bits allocated to primary coding information associated with the second audio frame, a second number of bits allocated to redundant coding information associated with the first audio frame, and an indicator of a frame type of the first audio frame. For example, the means for receiving may include the receiver 128 of FIG. 1, the antenna 1042 of FIG. 10, the wireless controller 1040 of FIG. 10, one or more devices configured to receive an audio frame, or any combination thereof. The apparatus may also include means for determining, based on the indicator, the second number of bits of the second audio frame that are allocated to the redundant coding information associated with the first audio frame. For example, the means for determining may include the processor 122 of FIG. 1, the decoder 126 of FIG. 1, the decoder 600 of FIG. 6, the first processor 1010 of FIG. 10, the second processor 1080 of FIG. 10, the speech decoder 1088 of FIG. 10, one or more devices configured to determine a number of bits allocated to redundant coding information, or any combination thereof. The apparatus may also include means for decoding the first audio frame based on the redundant coding information. For example, the means for decoding may include the decoder 126 of FIG. 1, the decoder 600 of FIG. 6, the first processor 1010 of FIG. 10, the second processor 1080 of FIG. 10, the speech decoder 1088 of FIG. 10, one or more devices configured to decode an audio frame based on redundant coding information, or any combination thereof.

A second apparatus is disclosed that includes means for encoding a first audio frame and a second audio frame of an audio signal, where the second audio frame follows a first audio frame in an audio signal. For example, the means for encoding may include the encoder 116 of FIG. 1, the encoder 500 of FIG. 5, the first processor 1010 of FIG. 10, the second processor 1080 of FIG. 10, the speech encoder 1087 of FIG. 10, one or more devices configured to encode an audio frame, or any combination thereof. The apparatus may also include means for determining, based on a frame type of the first audio frame, a first number of bits of the second audio frame to allocate to primary coding information associated with the second audio frame and a second number of bits of the second audio frame to allocate to redundant coding information associated with the first audio frame. For example, the means for determining may include the processor 112 of FIG. 1, the encoder 116 of FIG. 1, the encoder 500 of FIG. 1, the first processor 1010 of FIG. 10, the second processor 1080 of FIG. 10, the speech encoder 1087 of FIG. 10, one or more devices configured to determine bits allocated to primary coding information and to redundant coding information, or any combination thereof. The apparatus may also include means for transmitting the first audio frame and the second audio frame to a destination device. The second audio frame includes the first number of bits of primary coding information, the second number of bits of redundant coding information, and an indicator of the frame type of the first audio frame. For example, the means for transmitting may include the transmitter 118 of FIG. 1, the antenna 1042 of FIG. 10, the wireless controller 1040 of FIG. 10, one or more devices configured to transmit an audio frame, or any combination thereof.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a memory device (e.g., computer-readable or processor-readable storage device), such as RAM, MRAM, STT-MRAM, flash memory, ROM, PROM, EPROM, EEPROM, registers, hard disk, a removable disk, or an optical disc memory. An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal. A computer-readable or processor-readable storage device is not a signal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of decoding a frame, the method comprising:
receiving a second audio frame at a decoder of a computing device, wherein the second audio frame follows a first audio frame in an audio signal, wherein the second audio frame includes a first number of bits allocated to primary coding information associated with the second audio frame, a second number of bits allocated to redundant coding information associated with the first audio frame, and an indicator of a frame type of the first audio frame, wherein the redundant coding information includes a high-band line spectral pair (LSP) indicator associated with high-band LSPs of the first audio frame, and wherein the high-band LSP indicator includes one or more bits having a particular value that indicates a particular operation for the decoder to perform to generate the high-band LSPs of the first audio frame;
in response to a frame erasure condition associated with the first audio frame, determining, based on the indicator at the decoder of the computing device, the second number of bits of the second audio frame that are allocated to the redundant coding information associated with the first audio frame; and
synthesizing, at the decoder of the computing device, a signal corresponding to the first audio frame based on the redundant coding information.

2. The method of claim 1, further comprising decoding the second audio frame based on the primary coding information, wherein synthesizing the signal corresponding to the first audio frame based on the redundant coding information and decoding the second audio frame based on the primary coding information are performed at a single decoding path of the decoder.

3. The method of claim 1, further comprising retrieving the redundant coding information from the second audio frame based on the second number of bits.

4. The method of claim 1, wherein the frame erasure condition corresponds to a determination that the decoder is unable to decode at least a portion of the first audio frame or that the computing device did not receive the portion of the first audio frame, and wherein synthesizing the signal includes regenerating the portion of the first audio frame at the computing device based on the redundant coding information.

5. The method of claim 1, wherein the primary coding information includes an encoded low-band core of the second audio frame and high-band parameters of the second audio frame.

6. The method of claim 1, wherein the redundant coding information also includes a gain shape indicator associated with a high-band gain shape of the first audio frame, the method further comprising, in response to determining that the gain shape indicator has a first value, using a high-band gain shape of the second audio frame as an estimation of the high-band gain shape of the first audio frame.

7. The method of claim 1, wherein the redundant coding information also includes a gain shape indicator associated with a high-band gain shape of the first audio frame, the method further comprising, in response to determining that the gain shape indicator has a second value, using a constant gain shape as an estimation of the high-band gain shape of the first audio frame.

8. The method of claim 1, wherein the redundant coding information also includes a high-band gain frame indicator associated with a high-band gain frame of the first audio frame, and wherein the high-band gain frame indicator represents a codebook index.

9. The method of claim 1, wherein the redundant coding information also includes a high-band gain frame indicator associated with a high-band gain frame of the first audio frame, and wherein the high-band gain frame indicator indicates whether the high-band gain frame of the first audio frame corresponds to a codebook index in a first portion of a codebook corresponding to high codebook indexes or in a second portion of the codebook corresponding to low codebook indexes.

10. The method of claim 1, further comprising, in response to determining that the one or more bits of the high-band LSP indicator indicate a first value, using high-band LSPs of the second audio frame as an estimation of the high-band LSPs of the first audio frame.

11. The method of claim 1, further comprising, in response to determining that the one or more bits of the high-band LSP indicator indicate a second value, determining an estimation of the high-band LSPs of the first audio frame based on:

interpolation of high-band LSPs of the second audio frame and high-band LSPs of at least one audio frame that precedes the first audio frame; or extrapolation of high-band LSPs of a plurality of audio frames that precede the first audio frame.

12. The method of claim 1, wherein the one or more bits of the high-band LSP indicator indicate a difference between the high-band LSPs of the first audio frame and high-band LSPs of the second audio frame.

13. An apparatus comprising:
a receiver configured to receive a second audio frame that follows a first audio frame in an audio signal, wherein the second audio frame includes a first number of bits allocated to primary coding information associated with the second audio frame, a second number of bits allocated to redundant coding information associated with the first audio frame, high-band line spectral pairs (LSPs) associated with the second audio frame, and an indicator of a frame type of the first audio frame, wherein the redundant coding information includes one or more of a gain shape indicator associated with a high-band gain shape of the first audio frame, a high-band gain frame indicator associated with a high-band gain frame of the first audio frame, or a high-band line spectral pair (LSP) indicator associated with high-band LSPs of the first audio frame, and wherein the high-band LSP indicator is distinct from the high-band LSPs of the first audio frame and the high-band LSPs of the second audio frame; and
a decoder configured to:
in response to a frame erasure condition associated with the first audio frame, determine, based on the indicator, the second number of bits of the second audio frame that are allocated to the redundant coding information associated with the first audio frame; and
synthesize a signal corresponding to the first audio frame based on the redundant coding information.

14. The apparatus of claim 13, wherein the decoder comprises a single decoding path configured to decode the primary coding information associated with the second audio frame and the redundant coding information associated with the first audio frame.

15. The apparatus of claim 13, further comprising a de-jitter buffer configured to store audio frames received by the receiver.

16. A computer-readable storage device comprising instructions to decode a frame, the instructions executable to cause a computer to:
receive a second audio frame at a decoder of a computing device, wherein the second audio frame follows a first audio frame in an audio signal, wherein the second audio frame includes a first number of bits allocated to primary coding information associated with the second audio frame, a second number of bits allocated to redundant coding information associated with the first audio frame, and an indicator of a frame type of the first audio frame, and wherein the redundant coding information includes a gain shape indicator associated with a high-band gain shape of the first audio frame, a high-band gain frame indicator associated with a high-band gain frame of the first audio frame, and a high-band line spectral pair (LSP) indicator associated with high-band LSPs of the first audio frame;
in response to a frame erasure condition associated with the first audio frame, determine, based on the indicator, the second number of bits of the second audio frame that are allocated to the redundant coding information associated with the first audio frame; and
synthesize a signal corresponding to the first audio frame based on the redundant coding information.

17. The computer-readable storage device of claim 16, wherein the instructions are further executable to cause the computer to, in response to determining that the gain shape indicator has a first value, synthesize the signal corresponding to the first audio frame using a high-band gain shape of the second audio frame as an estimation of the high-band gain shape of the first audio frame.

18. The computer-readable storage device of claim 17, wherein the instructions are further executable to cause the computer to, in response to determining that the gain shape indicator has a second value, synthesize the signal corresponding to the first audio frame using a constant gain shape as the estimation of the high-band gain shape of the first audio frame.

19. The apparatus of claim 13, wherein the frame erasure condition corresponds to a determination that the decoder is unable to decode at least a portion of the first audio frame or that the receiver did not receive the portion of the first audio frame.

20. The apparatus of claim 13, wherein the decoder is further configured to, in response to determining that the gain shape indicator has a first value, synthesize the signal corresponding to the first audio frame using a high-band gain shape of the second audio frame as an estimation of the high-band gain shape of the first audio frame.

21. The apparatus of claim 20, wherein the decoder is further configured to, in response to determining that the gain shape indicator has a second value, synthesize the signal corresponding to the first audio frame using a constant gain shape as the estimation of the high-band gain shape of the first audio frame.

22. The apparatus of claim 13, wherein the high-band gain frame indicator represents a codebook index.

23. The apparatus of claim 13, wherein the high-band gain frame indicator indicates whether the high-band gain frame of the first audio frame corresponds to a codebook index in a first portion of a codebook corresponding to high codebook indexes or in a second portion of the codebook corresponding to low codebook indexes.

24. The apparatus of claim 13, wherein the decoder is further configured to, in response to determining that the high-band LSP indicator has a first value, use high-band LSPs of the second audio frame as an estimation of the high-band LSPs of the first audio frame.

25. The apparatus of claim 24, wherein the decoder is further configured to, in response to determining that the high-band LSP indicator has a second value, determine the estimation of the high-band LSPs of the first audio frame based on:
interpolation of the high-band LSPs of the second audio frame and high-band LSPs of at least one audio frame that precedes the first audio frame; or
extrapolation of high-band LSPs of a plurality of audio frames that precede the first audio frame.

26. The apparatus of claim 24, wherein the high-band LSP indicator indicates a difference between the high-band LSPs of the first audio frame and the high-band LSPs of the second audio frame.

27. The apparatus of claim 13, further comprising an antenna coupled to the receiver and configured to receive a signal that includes the first audio frame and the second audio frame.

28. The apparatus of claim 27, further comprising a mobile device, wherein the decoder, the receiver, and the antenna are integrated into the mobile device.

29. An apparatus, comprising:
means for receiving a second audio frame, wherein the second audio frame follows a first audio frame in an audio signal, wherein the second audio frame includes a first number of bits allocated to primary coding information associated with the second audio frame, a second number of bits allocated to redundant coding information associated with the first audio frame, high-band line spectral pairs (LSPs) associated with the second audio frame, and an indicator of a frame type of the first audio frame, and wherein the redundant coding information includes one or more of a gain shape indicator associated with a high-band gain shape of the first audio frame, a high-band gain frame indicator associated with a high-band gain frame of the first audio frame, or a high-band line spectral pair (LSP) indicator associated with high-band LSPs of the first audio frame, wherein the high-band LSP indicator is distinct from the high-band LSPs of the first audio frame and the high-band LSPs of the second audio frame; and
means for synthesizing a signal corresponding to the first audio frame based on the redundant coding information and further based on identifying, in response to the indicator, the second number of bits of the second audio frame that are allocated to the redundant coding information associated with the first audio frame.

30. The apparatus of claim 29, wherein the means for receiving and the means for synthesizing are integrated into a mobile device.

31. An apparatus comprising:
a receiver configured to receive a signal associated with a first audio frame and a second audio frame, the second audio frame including a first number of bits allocated to primary coding information associated with the second audio frame, a second number of bits allocated to redundant coding information associated with the first audio frame, and an indicator of a frame type of the first audio frame, wherein the primary coding information includes a second encoded low-band portion of the second audio frame and second high-band parameters of the second audio frame, wherein the redundant coding information includes a high-band line spectral pair (LSP) indicator associated with high-band LSPs of the first audio frame, and wherein the high-band LSP indicator includes one or more bits having a particular value that indicates a particular operation for a decoder to perform to generate the high-band LSPs of the first audio frame; and
the decoder configured to determine, in response to a frame erasure condition associated with the first audio frame and based on the indicator, the second number of bits of the second audio frame that are allocated to the redundant coding information associated with the first audio frame, to synthesize a signal corresponding to the first audio frame by regenerating the first audio frame based on the redundant coding information, and to provide the synthesized signal to a device that includes a speaker.

32. The apparatus of claim 31, wherein the indicator specifies that the first audio frame has an all-predictive frame type, a noise-excited linear prediction frame type, a generic frame type, a no-predictive frame type, or a frame type carrying no redundant coding information.

33. The method of claim 1, wherein the second frame is separated from the first frame by a frame offset, the frame offset corresponding to a positive integer that is greater than zero, and wherein the frame offset is selected by an encoder based on a network condition associated with a network used to receive the second frame.

34. The apparatus of claim 13, wherein the high-band LSP indicator includes one or more bits having a particular value that indicates a particular operation for the decoder to perform to generate the high-band LSPs of the first audio frame.

35. The method of claim 1, wherein the second audio frame further includes high-band LSPs associated with the second audio frame, and wherein the high-band LSP indicator is distinct from the high-band LSPs of the first audio frame and the high-band LSPs of the second audio frame.

36. The method of claim 1, wherein the redundant coding information also includes: a gain shape indicator associated with a high-band gain shape of the first audio frame, and a high-band gain frame indicator associated with a high-band gain frame of the first audio frame.

* * * * *